US010460381B1

(12) United States Patent
Pollack et al.

(10) Patent No.: US 10,460,381 B1
(45) **Date of Patent: *Oct. 29, 2019**

(54) SYSTEMS AND METHODS FOR OBTAINING AN IMAGE OF A CHECK TO BE DEPOSITED

(71) Applicant: United Services Automobile Association (USAA), San Antonio, TX (US)

(72) Inventors: Jeff Pollack, San Antonio, TX (US); Michael Frank Morris, San Antonio, TX (US); Bharat Prasad, San Antonio, TX (US); Frank Kyle Major, San Antonio, TX (US); John Weatherman Brady, Boerne, TX (US); Ralph Paige Mawyer, Jr., San Antonio, TX (US); Clint James Reynolds, San Antonio, TX (US); Kairav Mahesh Shah, Katy, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/878,821

(22) Filed: Jan. 24, 2018

Related U.S. Application Data

(63) Continuation of application No. 11/877,335, filed on Oct. 23, 2007, now Pat. No. 9,892,454.

(51) Int. Cl.
*G06Q 20/10* (2012.01)
*G06Q 40/00* (2012.01)

(52) U.S. Cl.
CPC .................................... *G06Q 40/00* (2013.01)

(58) Field of Classification Search
CPC ...... G06Q 40/025; G06Q 40/00; G06Q 40/02; G06Q 20/10; G06Q 20/102; G06Q 20/40; G06Q 40/04

(Continued)

(56) References Cited

U.S. PATENT DOCUMENTS

| | | | |
|---|---|---|---|
| 1,748,489 | A | 2/1930 | McCarthy et al. |
| 2,292,825 | A | 8/1942 | Dilks et al. |

(Continued)

FOREIGN PATENT DOCUMENTS

| | | |
|---|---|---|
| EP | 0 984 410 A1 | 3/2000 |
| EP | 1 855 459 A2 | 5/2007 |

(Continued)

OTHER PUBLICATIONS

"Accept "Customer Not Present" Checks," Accept Check Online, http://checksoftware.com, Cited in U.S. Pat. No. 7,900,822, as dated 2007 (1 pg).

(Continued)

*Primary Examiner* — Hani M Kazimi
(74) *Attorney, Agent, or Firm* — Brinks Gilson & Lione

(57) ABSTRACT

An image of a check may be presented for payment in a banking system in place of the physical paper check. The check to be deposited can be collected from a depositor using a scanner. A web site, accessed through a depositor's web browser, can be used to drive the process of collecting the check, but in some contexts (e.g., in less popular computing environments, such as those that do not run the most popular operating systems), it is economically infeasible to obtain the certificates that would be used to allow a program executing in the web browser to control the scanner. Thus, a depositor can be instructed to capture and (Continued)

upload images of the check in the form of files, where the image files are then presented for payment through a banking system.

21 Claims, 7 Drawing Sheets

(58) Field of Classification Search
USPC ........................................................ 705/45
See application file for complete search history.

(56) References Cited

U.S. PATENT DOCUMENTS 3,005,282 A 10/1961 Christiansen
3,341,820 A 9/1967 Grillmeier, Jr. et al.
3,576,972 A 5/1971 Wood
3,593,913 A 7/1971 Bremer
3,620,553 A 11/1971 Donovan
3,648,242 A 3/1972 Grosbard
3,800,124 A 3/1974 Walsh
3,816,943 A 6/1974 Henry
4,002,356 A 1/1977 Weidmann
4,027,142 A 5/1977 Paup et al.
4,060,711 A 11/1977 Buros
4,070,649 A 1/1978 Wright, Jr. et al.
4,128,202 A 12/1978 Buros
4,136,471 A 1/1979 Austin
4,205,780 A 6/1980 Burns
4,264,808 A 4/1981 Owens
4,305,216 A 12/1981 Skelton
4,321,672 A 3/1982 Braun
4,346,442 A 8/1982 Musmanno
4,417,136 A 11/1983 Rushby et al.
4,433,436 A 2/1984 Carnes
4,454,610 A 6/1984 Sziklai
RE31,692 E 10/1984 Tyburski et al.
4,523,330 A 6/1985 Cain
4,636,099 A 1/1987 Goldston
4,640,413 A 2/1987 Kaplan
4,644,144 A 2/1987 Chandek
4,722,444 A 2/1988 Murphy et al.
4,722,544 A 2/1988 Weber
4,727,435 A 2/1988 Otani et al.
4,737,911 A 4/1988 Freeman
4,739,411 A 4/1988 Bolton
4,774,574 A 9/1988 Daly et al.
4,774,663 A 9/1988 Musmanno
4,790,475 A 12/1988 Griffin
4,806,780 A 2/1989 Yamamoto
4,837,693 A 6/1989 Schotz
4,890,228 A 12/1989 Longfield
4,927,071 A 5/1990 Wood
4,934,587 A 6/1990 McNabb
4,960,981 A 10/1990 Benton
4,975,735 A 12/1990 Bright
5,022,683 A 6/1991 Barbour
5,053,607 A 10/1991 Carlson
5,122,950 A 6/1992 Benton et al.
5,134,564 A 7/1992 Dunn et al.
5,146,606 A 9/1992 Grondalski
5,157,620 A 10/1992 Shaar
5,159,548 A 10/1992 Caslavka
5,175,682 A 12/1992 Higashiyama et al.
5,187,750 A 2/1993 Behera
5,191,525 A 3/1993 LeBrun
5,193,121 A 3/1993 Elischer et al.
5,220,501 A 6/1993 Lawlor
5,227,863 A 7/1993 Bilbrey et al.
5,229,589 A 7/1993 Schneider
5,233,547 A 8/1993 Kapp et al.
5,237,158 A 8/1993 Kern et al.
5,237,159 A 8/1993 Stephens
5,257,320 A 10/1993 Etherington et al.
5,265,008 A 11/1993 Benton
5,268,968 A 12/1993 Yoshida
5,283,829 A 2/1994 Anderson
5,321,816 A 6/1994 Rogan
5,347,302 A 9/1994 Simonoff
5,350,906 A 9/1994 Brody
5,373,550 A 12/1994 Campbell
5,383,113 A 1/1995 Kight et al.
5,419,588 A 5/1995 Wood
5,422,467 A 6/1995 Graef
5,444,794 A 8/1995 Uhland, Sr.
5,475,403 A 12/1995 Havlovick et al.
5,504,538 A 4/1996 Tsujihara
5,504,677 A 4/1996 Pollin
5,528,387 A 6/1996 Kelly et al.
5,530,773 A 6/1996 Thompson
5,577,179 A 11/1996 Blank
5,583,759 A 12/1996 Geer
5,590,196 A 12/1996 Moreau
5,594,225 A 1/1997 Botvin
5,598,969 A 2/1997 Ong
5,602,936 A 2/1997 Green
5,610,726 A 3/1997 Nonoshita
5,611,028 A 3/1997 Shibasaki
5,630,073 A 5/1997 Nolan
5,631,984 A 5/1997 Graf et al.
5,668,897 A 9/1997 Stolfo
5,673,320 A 9/1997 Ray et al.
5,677,955 A 10/1997 Doggett
5,678,046 A 10/1997 Cahill et al.
5,679,938 A 10/1997 Templeton
5,680,611 A 10/1997 Rail
5,691,524 A 11/1997 Josephson
5,699,452 A 12/1997 Vaidyanathan
5,734,747 A 3/1998 Vaidyanathan
5,737,440 A 4/1998 Kunkler
5,748,780 A 5/1998 Stolfo
5,751,842 A 5/1998 Riach
5,761,686 A 6/1998 Bloomberg
5,784,503 A 7/1998 Bleecker, III et al.
5,830,609 A 11/1998 Warner
5,832,463 A 11/1998 Funk
5,838,814 A 11/1998 Moore
5,848,185 A 12/1998 Koga et al.
5,859,935 A 1/1999 Johnson et al.
5,863,075 A 1/1999 Rich
5,870,456 A 2/1999 Rogers
5,870,724 A 2/1999 Lawlor
5,870,725 A 2/1999 Bellinger et al.
5,878,337 A 3/1999 Joao
5,889,884 A 3/1999 Hashimoto et al.
5,893,101 A 4/1999 Balogh et al.
5,897,625 A 4/1999 Gustin
5,898,157 A 4/1999 Mangili et al.
5,901,253 A 5/1999 Tretter
5,903,878 A 5/1999 Talati
5,903,881 A 5/1999 Schrader
5,910,988 A 6/1999 Ballard
5,917,931 A 6/1999 Kunkler
5,924,737 A 7/1999 Schrupp
5,926,548 A 7/1999 Okamoto
5,930,778 A 7/1999 Geer
5,937,396 A 8/1999 Konya
5,940,844 A 8/1999 Cahill
5,982,918 A 11/1999 Mennie
5,987,439 A 11/1999 Gustin et al.
6,012,048 A 1/2000 Gustin et al.
6,014,454 A 1/2000 Kunkler
6,021,202 A 2/2000 Anderson
6,021,397 A 2/2000 Jones
6,023,705 A 2/2000 Bellinger et al.
6,029,887 A 2/2000 Furuhashi
6,030,000 A 2/2000 Diamond
6,032,137 A 2/2000 Ballard
6,038,553 A 3/2000 Hyde
6,053,405 A 4/2000 Irwin, Jr. et al.
6,064,762 A 5/2000 Haenel
6,072,941 A 6/2000 Suzuki et al.
6,073,119 A 6/2000 Borenmisza-wahr
6,073,121 A 6/2000 Ramzy
6,085,168 A 7/2000 Mori

(56) References Cited

U.S. PATENT DOCUMENTS 6,086,708 A 7/2000 Colgate
6,089,450 A 7/2000 Koeple
6,089,610 A 7/2000 Greene
6,092,047 A 7/2000 Hyman et al.
6,097,834 A 8/2000 Krouse
6,097,845 A 8/2000 Ng et al.
6,097,885 A 8/2000 Rayner
6,105,865 A 8/2000 Hardesty
6,128,603 A 10/2000 Dent et al.
6,141,339 A 10/2000 Kaplan et al.
6,145,738 A 11/2000 Stinson et al.
6,149,056 A 11/2000 Stinson et al.
6,151,409 A 11/2000 Chen et al.
6,151,423 A 11/2000 Melen
6,151,426 A 11/2000 Lee
6,159,585 A 12/2000 Rittenhouse
6,170,744 B1 1/2001 Lee
6,178,409 B1 1/2001 Weber et al.
6,188,506 B1 2/2001 Kaiserman
6,189,785 B1 2/2001 Lowery
6,192,165 B1 2/2001 Irons
6,195,694 B1 2/2001 Chen et al.
6,199,055 B1 3/2001 Kara
6,236,009 B1 5/2001 Emigh et al.
6,243,689 B1 6/2001 Norton
6,278,983 B1 8/2001 Ball
6,282,523 B1 8/2001 Tedesco et al.
6,282,826 B1 9/2001 Richards
6,293,469 B1 9/2001 Masson et al.
6,304,860 B1 10/2001 Martin
6,310,647 B1 10/2001 Parulski et al.
6,314,452 B1 11/2001 Dekel
6,317,727 B1 11/2001 May
6,328,207 B1 12/2001 Gregoire et al.
6,330,546 B1 12/2001 Gopinathan et al.
6,339,658 B1 1/2002 Moccagatta
6,339,766 B1 1/2002 Gephart
6,351,553 B1 2/2002 Hayosh
6,354,490 B1 3/2002 Weiss et al.
6,363,162 B1 3/2002 Moed et al.
6,363,164 B1 3/2002 Jones et al.
6,390,362 B1 5/2002 Martin
6,397,196 B1 5/2002 Kravetz
6,408,084 B1 6/2002 Foley
6,411,725 B1 6/2002 Rhoads
6,411,737 B2 6/2002 Wesolkowski et al.
6,411,938 B1 6/2002 Gates et al.
6,413,305 B1 7/2002 Mehta
6,417,869 B1 7/2002 Do
6,425,017 B1 7/2002 Dievendorff
6,429,952 B1 8/2002 Olbricht
6,439,454 B1 8/2002 Masson et al.
6,449,397 B1 9/2002 Che-Chu
6,450,403 B1 9/2002 Martens et al.
6,463,220 B1 10/2002 Dance et al.
6,464,134 B1 10/2002 Page
6,469,745 B1 10/2002 Yamada et al.
6,470,325 B1 10/2002 Leemhuis
6,502,747 B1 1/2003 Stoutenburg et al.
6,505,178 B1 1/2003 Flenley
6,546,119 B2 4/2003 Ciolli et al.
6,574,377 B1 6/2003 Cahill et al.
6,574,609 B1 6/2003 Downs
6,578,760 B1 6/2003 Otto
6,587,837 B1 7/2003 Spagna
6,606,117 B1 8/2003 Windle
6,609,200 B2 8/2003 Anderson
6,611,598 B1 8/2003 Hayosh
6,614,930 B1 9/2003 Agnihotri et al.
6,643,416 B1 11/2003 Daniels
6,647,136 B2 11/2003 Jones et al.
6,654,487 B1 11/2003 Downs, Jr.
6,661,910 B2 12/2003 Jones et al.
6,669,086 B2 12/2003 Abdi et al.
6,672,452 B1 1/2004 Alves
6,682,452 B2 1/2004 Quintus
6,695,204 B1 2/2004 Stinson
6,711,474 B1 3/2004 Treyz et al.
6,726,097 B2 4/2004 Graef
6,728,397 B2 4/2004 Mcneal
6,738,496 B1 5/2004 Van Hall
6,742,128 B1 5/2004 Joiner
6,745,186 B1 6/2004 Testa et al.
6,754,640 B2 6/2004 Bozeman
6,755,340 B1 6/2004 Voss et al.
6,760,414 B1 7/2004 Schurko et al.
6,760,470 B1 7/2004 Bogosian et al.
6,763,226 B1 7/2004 McZeal
6,781,962 B1 8/2004 Williams
6,786,398 B1 9/2004 Stinson et al.
6,789,054 B1 9/2004 Makhlouf
6,796,489 B2 9/2004 Slater et al.
6,796,491 B2 9/2004 Nakajima
6,806,903 B1 10/2004 Okisu et al.
6,807,294 B2 10/2004 Yamazaki
6,813,733 B1 11/2004 Li
6,829,704 B2 12/2004 Zhang
6,844,885 B2 1/2005 Anderson
6,856,965 B1 2/2005 Stinson
6,863,214 B2 3/2005 Garner et al.
6,870,947 B2 3/2005 Kelland
6,873,728 B2 3/2005 Bernstein et al.
6,883,140 B1 4/2005 Acker
6,898,314 B2 5/2005 Kung et al.
6,902,105 B2 6/2005 Koakutsu
6,910,023 B1 6/2005 Schibi
6,913,188 B2 7/2005 Wong
6,931,255 B2 8/2005 Mekuria
6,931,591 B1 8/2005 Brown
6,934,719 B2 8/2005 Nally
6,947,610 B2 9/2005 Sun
6,957,770 B1 10/2005 Robinson
6,961,689 B1 11/2005 Greenberg
6,970,843 B1 11/2005 Forte
6,973,589 B2 12/2005 Wright
6,983,886 B2 1/2006 Natsukari et al.
6,993,507 B2 1/2006 Meyer
6,996,263 B2 2/2006 Jones et al.
6,999,943 B1 2/2006 Johnson
7,003,040 B2 2/2006 Yi
7,004,382 B2 2/2006 Sandru
7,010,155 B2 3/2006 Koakutsu et al.
7,010,507 B1 3/2006 Anderson
7,016,704 B2 3/2006 Pallakoff
7,027,171 B1 4/2006 Watanabe
7,028,886 B1 4/2006 Maloney
7,039,048 B1 5/2006 Monta
7,046,991 B2 5/2006 Little
7,051,001 B1 5/2006 Slater
7,058,036 B1 6/2006 Yu
7,062,099 B2 6/2006 Li et al.
7,062,456 B1 6/2006 Riehl et al.
7,062,768 B2 6/2006 Kubo
7,072,862 B1 7/2006 Wilson
7,076,458 B2 7/2006 Lawlor et al.
7,086,003 B2 8/2006 Demsky
7,092,561 B2 8/2006 Downs, Jr.
7,104,443 B1 9/2006 Paul et al.
7,113,925 B2 9/2006 Waserstein
7,114,649 B2 10/2006 Nelson
7,116,446 B2 10/2006 Maurer
7,117,171 B1 10/2006 Pollin
7,120,461 B2 10/2006 Cho
7,131,571 B2 11/2006 Swift et al.
7,139,594 B2 11/2006 Nagatomo
7,140,539 B1 11/2006 Crews
7,163,347 B2 1/2007 Lugg
7,178,721 B2 2/2007 Maloney
7,181,430 B1 2/2007 Buchanan et al.
7,184,980 B2 2/2007 Allen-Rouman et al.
7,185,805 B1 3/2007 McShirley
7,197,173 B2 3/2007 Jones et al.
7,200,255 B2 4/2007 Jones
7,204,412 B2 4/2007 Foss, Jr.

(56) References Cited

U.S. PATENT DOCUMENTS 7,216,106 B1 5/2007 Buchanan
7,219,082 B2 5/2007 Forte
7,219,831 B2 5/2007 Murata
7,245,765 B2 7/2007 Myers et al.
7,249,076 B1 7/2007 Pendleton
7,252,224 B2 8/2007 Verma
7,257,246 B1 8/2007 Brodie et al.
7,266,230 B2 9/2007 Doran
7,277,191 B2 10/2007 Metcalfe et al.
7,290,034 B2 10/2007 Budd
7,299,970 B1 11/2007 Ching
7,299,979 B2 11/2007 Phillips
7,313,543 B1 12/2007 Crane
7,314,163 B1 1/2008 Crews et al.
7,321,874 B2 1/2008 Dilip
7,321,875 B2 1/2008 Dilip
7,325,725 B2 2/2008 Foss, Jr.
7,328,190 B2 2/2008 Smith et al.
7,330,604 B2 2/2008 Wu et al.
7,331,523 B2 2/2008 Meier et al.
7,336,813 B2 2/2008 Prakash et al.
7,343,320 B1 3/2008 Treyz
7,349,566 B2 3/2008 Jones et al.
7,349,585 B2 3/2008 Li
7,350,697 B2 4/2008 Swift et al.
7,356,505 B2 4/2008 March
7,369,713 B2 5/2008 Suino
7,377,425 B1 5/2008 Ma
7,379,978 B2 5/2008 Anderson
7,383,227 B2 6/2008 Weinflash et al.
7,385,631 B2 6/2008 Maeno
7,386,511 B2 6/2008 Buchanan
7,388,683 B2 6/2008 Rodriguez et al.
7,391,897 B2 6/2008 Jones et al.
7,391,934 B2 6/2008 Goodall et al.
7,392,935 B2 7/2008 Byrne
7,401,048 B2 7/2008 Rosedale
7,403,917 B1 7/2008 Larsen
7,406,198 B2 7/2008 Aoki et al.
7,419,093 B1 9/2008 Blackson et al.
7,421,107 B2 9/2008 Lugg
7,421,410 B1 9/2008 Schechtman et al.
7,427,016 B2 9/2008 Chimento
7,433,098 B2 10/2008 Klein et al.
7,437,327 B2 10/2008 Lam
7,440,924 B2 10/2008 Buchanan
7,447,347 B2 11/2008 Weber
7,455,220 B2 11/2008 Phillips
7,455,221 B2 11/2008 Sheaffer
7,460,108 B2 12/2008 Tamura
7,460,700 B2 12/2008 Tsunachima et al.
7,461,779 B2 12/2008 Ramachandran
7,461,780 B2 12/2008 Potts
7,464,859 B1 12/2008 Hawkins
7,471,818 B1 12/2008 Price
7,475,040 B2 1/2009 Buchanan
7,477,923 B2 1/2009 Wallmark
7,480,382 B2 1/2009 Dunbar
7,480,422 B2 1/2009 Ackley et al.
7,489,953 B2 2/2009 Griffin
7,490,242 B2 2/2009 Torres
7,497,429 B2 3/2009 Reynders
7,503,486 B2 3/2009 Ahles
7,505,759 B1 3/2009 Rahman
7,506,261 B2 3/2009 Statou
7,509,287 B2 3/2009 Nutahara
7,512,564 B1 3/2009 Geer
7,519,560 B2 4/2009 Lam
7,520,420 B2 4/2009 Phillips
7,520,422 B1 4/2009 Robinson et al.
7,536,354 B1 5/2009 deGroeve et al.
7,536,440 B2 5/2009 Budd
7,539,646 B2 5/2009 Gilder
7,540,408 B2 6/2009 Levine
7,542,598 B2 6/2009 Jones
7,545,529 B2 6/2009 Borrey et al.
7,548,641 B2 6/2009 Gilson et al.
7,566,002 B2 7/2009 Love et al.
7,571,848 B2 8/2009 Cohen
7,577,614 B1 8/2009 Warren et al.
7,587,066 B2 9/2009 Cordery et al.
7,587,363 B2 9/2009 Cataline
7,590,275 B2 9/2009 Clarke et al.
7,599,543 B2 10/2009 Jones
7,599,888 B2 10/2009 Manfre
7,602,956 B2 10/2009 Jones
7,606,762 B1 10/2009 Heit
7,609,873 B2 10/2009 Foth et al.
7,609,889 B2 10/2009 Guo et al.
7,619,721 B2 11/2009 Jones
7,620,231 B2 11/2009 Jones
7,620,604 B1 11/2009 Bueche, Jr.
7,630,518 B2 12/2009 Frew et al.
7,644,037 B1 1/2010 Ostrovsky
7,644,043 B2 1/2010 Minowa
7,647,275 B2 1/2010 Jones
7,668,363 B2 2/2010 Price
7,672,022 B1 3/2010 Fan
7,672,940 B2 3/2010 Viola
7,676,409 B1 3/2010 Ahmad
7,680,732 B1 3/2010 Davies et al.
7,680,735 B1 3/2010 Loy
7,689,482 B2 3/2010 Lam
7,697,776 B2 4/2010 Wu et al.
7,698,222 B1 4/2010 Bueche, Jr.
7,702,588 B2 4/2010 Gilder et al.
7,714,778 B2 5/2010 Dupray
7,720,735 B2 5/2010 Anderson et al.
7,734,545 B1 6/2010 Fogliano
7,743,979 B2 6/2010 Fredman
7,753,268 B1 7/2010 Robinson et al.
7,761,358 B2 7/2010 Craig et al.
7,766,244 B1 8/2010 Field
7,769,650 B2 8/2010 Bleunven
7,772,685 B2 8/2010 Oakes, III et al.
7,778,457 B2 8/2010 Nepomniachtchi et al.
7,792,752 B1 9/2010 Kay
7,792,753 B1 9/2010 Slater et al.
7,793,833 B2 9/2010 Yoon et al.
7,810,714 B2 10/2010 Murata
7,812,986 B2 10/2010 Graham et al.
7,818,245 B2 10/2010 Prakash et al.
7,831,458 B2 11/2010 Neumann
7,856,402 B1 12/2010 Kay
7,865,384 B2 1/2011 Anderson et al.
7,873,200 B1 1/2011 Oakes, III et al.
7,876,949 B1 1/2011 Oakes, III et al.
7,885,451 B1 2/2011 Walls et al.
7,885,880 B1 2/2011 Prasad et al.
7,894,094 B2 2/2011 Nacman et al.
7,895,054 B2 2/2011 Slen et al.
7,896,232 B1 3/2011 Prasad et al.
7,900,822 B1 3/2011 Prasad et al.
7,903,863 B2 3/2011 Jones et al.
7,904,386 B2 3/2011 Kalra et al.
7,912,785 B1 3/2011 Kay
7,935,441 B2 5/2011 Tononishi
7,949,587 B1 5/2011 Morris et al.
7,950,698 B2 5/2011 Popadic et al.
7,953,441 B2 5/2011 Lors
7,958,053 B2 6/2011 Stone
7,962,411 B1 6/2011 Prasad et al.
7,970,677 B1 6/2011 Oakes, III et al.
7,974,899 B1 7/2011 Prasad et al.
7,978,900 B2 7/2011 Nepomniachtchi et al.
7,979,326 B2 7/2011 Kurushima
7,996,312 B1 8/2011 Beck et al.
7,996,314 B1 8/2011 Smith et al.
7,996,315 B1 8/2011 Smith et al.
7,996,316 B1 8/2011 Smith et al.
8,001,051 B1 8/2011 Smith et al.
8,045,784 B2 10/2011 Price et al.
8,046,301 B1 10/2011 Smith et al.
8,060,442 B1 11/2011 Hecht et al.

(56) References Cited

U.S. PATENT DOCUMENTS 8,065,307 B2 11/2011 Haslam et al.
8,091,778 B1 1/2012 Block et al.
8,116,533 B2 2/2012 Kiplinger et al.
8,159,520 B1 4/2012 Dhanoa
8,203,640 B2 6/2012 Kim et al.
8,204,293 B2 6/2012 Csulits et al.
8,235,284 B1 8/2012 Prasad et al.
8,266,076 B2 9/2012 Lopez et al.
8,271,385 B2 9/2012 Emerson et al.
8,290,237 B1 10/2012 Burks et al.
8,313,020 B2 11/2012 Ramachandran
8,320,657 B1 11/2012 Burks et al.
8,332,329 B1 12/2012 Thiele
8,351,677 B1 1/2013 Oakes, III et al.
8,351,678 B1 1/2013 Medina, III
8,358,826 B1 1/2013 Medina et al.
8,364,563 B2 1/2013 Choiniere, Sr.
8,369,650 B2 2/2013 Zanfir et al.
8,374,963 B1 2/2013 Billman
8,391,599 B1 3/2013 Medina, III
8,392,332 B1 3/2013 Oakes, III et al.
8,401,962 B1 3/2013 Bent et al.
8,422,758 B1 4/2013 Bueche, Jr.
8,433,127 B1 4/2013 Harpel et al.
8,433,647 B1 4/2013 Yarbrough
8,452,689 B1 5/2013 Medina, III
8,464,933 B1 6/2013 Prasad et al.
8,538,124 B1 9/2013 Harpel et al.
8,542,921 B1 9/2013 Medina
8,548,267 B1 10/2013 Yacoub et al.
8,559,766 B2 10/2013 Tilt et al.
8,582,862 B2 11/2013 Nepomniachtchi et al.
8,611,635 B1 12/2013 Medina, III
8,660,952 B1 2/2014 Viera et al.
8,699,779 B1 4/2014 Prasad et al.
8,708,227 B1 4/2014 Oakes, III et al.
8,731,321 B2 5/2014 Fujiwara et al.
8,732,081 B1 5/2014 Oakes, III et al.
8,751,345 B1 6/2014 Borzych et al.
8,751,356 B1 6/2014 Garcia
8,751,379 B1 6/2014 Bueche, Jr.
8,799,147 B1 8/2014 Walls et al.
8,837,806 B1 9/2014 Ethington et al.
8,843,405 B1 9/2014 Hartman et al.
8,959,033 B1 2/2015 Oakes, III et al.
8,977,571 B1 3/2015 Bueche, Jr. et al.
8,990,862 B1 3/2015 Smith
9,009,071 B1 4/2015 Watson et al.
9,036,040 B1 5/2015 Danko
9,058,512 B1 6/2015 Medina, III
9,064,284 B1 6/2015 Janiszeski et al.
9,129,340 B1 8/2015 Medina, III et al.
9,159,101 B1 10/2015 Pollack et al.
9,177,197 B1 11/2015 Prasad et al.
9,177,198 B1 11/2015 Prasad et al.
9,224,136 B1 12/2015 Oakes, III et al.
9,286,514 B1 3/2016 Newman
9,311,634 B1 4/2016 Hildebrand
9,336,517 B1 5/2016 Prasad et al.
9,390,339 B1 7/2016 Danko
9,401,011 B2 7/2016 Medina, III et al.
9,424,569 B1 8/2016 Sherman et al.
9,569,756 B1 2/2017 Bueche, Jr. et al.
9,619,872 B1 4/2017 Medina, III et al.
9,626,183 B1 4/2017 Smith et al.
9,626,662 B1 4/2017 Prasad et al.
9,779,392 B1 10/2017 Prasad et al.
9,779,452 B1 10/2017 Medina et al.
9,785,929 B1 10/2017 Watson et al.
9,792,654 B1 10/2017 Limas et al.
9,818,090 B1 11/2017 Bueche, Jr. et al.
9,886,642 B1 2/2018 Danko
9,892,454 B1 2/2018 Pollack et al.
9,898,778 B1 2/2018 Pollack et al.
9,898,808 B1 2/2018 Medina, III et al.
9,904,848 B1 2/2018 Newman
9,946,923 B1 4/2018 Medina
10,013,605 B1 7/2018 Oakes, III et al.
10,013,681 B1 7/2018 Oakes, III et al.
10,181,087 B1 1/2019 Danko
10,235,660 B1 3/2019 Bueche, Jr. et al.
10,325,420 B1 6/2019 Moon
10,354,235 B1 7/2019 Medina
2001/0004235 A1 6/2001 Maloney
2001/0014881 A1 8/2001 Drummond
2001/0016084 A1 8/2001 Pollard et al.
2001/0018739 A1 8/2001 Anderson
2001/0027994 A1 10/2001 Hayashida
2001/0037299 A1 11/2001 Nichols et al.
2001/0042171 A1 11/2001 Vermeulen
2001/0042785 A1 11/2001 Walker
2001/0043748 A1 11/2001 Wesolkowski et al.
2001/0047330 A1 11/2001 Gephart
2001/0054020 A1 12/2001 Barth et al.
2002/0001393 A1 1/2002 Jones
2002/0013767 A1 1/2002 Katz
2002/0016763 A1 2/2002 March
2002/0016769 A1 2/2002 Barbara et al.
2002/0023055 A1 2/2002 Antognini et al.
2002/0026418 A1 2/2002 Koppel et al.
2002/0032656 A1 3/2002 Chen
2002/0038289 A1 3/2002 Lawlor et al.
2002/0040340 A1 4/2002 Yoshida
2002/0052841 A1 5/2002 Guthrie
2002/0052853 A1 5/2002 Munoz
2002/0065786 A1 5/2002 Martens et al.
2002/0072974 A1 6/2002 Pugliese
2002/0075524 A1 6/2002 Blair
2002/0084321 A1 7/2002 Martens
2002/0087467 A1 7/2002 Mascavage, III et al.
2002/0107767 A1 8/2002 McClair et al.
2002/0107809 A1 8/2002 Biddle et al.
2002/0116329 A1 8/2002 Serbetcioglu
2002/0116335 A1 8/2002 Star
2002/0118891 A1 8/2002 Rudd
2002/0120562 A1 8/2002 Opiela
2002/0120582 A1 8/2002 Elston et al.
2002/0120846 A1 8/2002 Stewart et al.
2002/0129249 A1 9/2002 Maillard et al.
2002/0130868 A1 9/2002 Smith
2002/0133409 A1 9/2002 Sawano et al.
2002/0138445 A1 9/2002 Laage et al.
2002/0138522 A1 9/2002 Muralidhar
2002/0147798 A1 10/2002 Huang
2002/0150279 A1 10/2002 Scott
2002/0150311 A1 10/2002 Lynn
2002/0152160 A1 10/2002 Allen-Rouman et al.
2002/0152161 A1 10/2002 Aoike
2002/0152164 A1 10/2002 Dutta
2002/0152165 A1 10/2002 Dutta et al.
2002/0152169 A1 10/2002 Dutta et al.
2002/0152170 A1 10/2002 Dutta
2002/0153414 A1 10/2002 Stoutenburg et al.
2002/0154127 A1 10/2002 Vienneau et al.
2002/0159648 A1 10/2002 Alderson et al.
2002/0169715 A1 11/2002 Ruth et al.
2002/0171820 A1 11/2002 Okamura
2002/0178112 A1 11/2002 Goeller
2002/0186881 A1 12/2002 Li
2002/0188564 A1 12/2002 Star
2002/0195485 A1 12/2002 Pomerleau et al.
2003/0005326 A1 1/2003 Flemming
2003/0009420 A1 1/2003 Jones
2003/0015583 A1 1/2003 Abdi et al.
2003/0018897 A1 1/2003 Bellis, Jr. et al.
2003/0023557 A1 1/2003 Moore
2003/0026609 A1 2/2003 Parulski
2003/0038227 A1 2/2003 Sesek
2003/0050889 A1 3/2003 Burke
2003/0053692 A1 3/2003 Hong et al.
2003/0055756 A1 3/2003 Allan
2003/0055776 A1 3/2003 Samuelson
2003/0072568 A1 4/2003 Lin et al.
2003/0074315 A1 4/2003 Lam

(56) References Cited

U.S. PATENT DOCUMENTS

2003/0075596 A1 4/2003 Koakutsu
2003/0075916 A1 4/2003 Gorski
2003/0078883 A1 4/2003 Stewart et al.
2003/0081824 A1 5/2003 Mennie
2003/0086615 A1 5/2003 Dance et al.
2003/0093367 A1 5/2003 Allen-Rouman et al.
2003/0093369 A1 5/2003 Ijichi et al.
2003/0102714 A1 6/2003 Rhodes et al.
2003/0105688 A1 6/2003 Brown et al.
2003/0105714 A1 6/2003 Alarcon-Luther et al.
2003/0126078 A1 7/2003 Vihinen
2003/0126082 A1 7/2003 Omura et al.
2003/0130940 A1 7/2003 Hansen et al.
2003/0130958 A1 7/2003 Narayanan et al.
2003/0132384 A1 7/2003 Sugiyama et al.
2003/0133608 A1 7/2003 Bernstein et al.
2003/0133610 A1 7/2003 Nagarajan et al.
2003/0135457 A1 7/2003 Stewart et al.
2003/0139999 A1 7/2003 Rowe
2003/0159046 A1 8/2003 Choi et al.
2003/0167225 A1 9/2003 Adams
2003/0187790 A1 10/2003 Swift et al.
2003/0191615 A1 10/2003 Bailey
2003/0191869 A1 10/2003 Williams
2003/0200107 A1 10/2003 Allen et al.
2003/0200174 A1 10/2003 Star
2003/0202690 A1 10/2003 Jones et al.
2003/0212904 A1 11/2003 Randle et al.
2003/0217005 A1 11/2003 Drummond et al.
2003/0218061 A1 11/2003 Filatov
2003/0225705 A1 12/2003 Park et al.
2003/0231285 A1 12/2003 Ferguson
2003/0233278 A1 12/2003 Marshall
2003/0233318 A1 12/2003 King et al.
2004/0010466 A1 1/2004 Anderson
2004/0012496 A1 1/2004 De Souza
2004/0013284 A1 1/2004 Yu
2004/0017482 A1 1/2004 Weitman
2004/0024626 A1 2/2004 Bruijning
2004/0024708 A1 2/2004 Masuda
2004/0029591 A1 2/2004 Chapman et al.
2004/0030741 A1 2/2004 Wolton et al.
2004/0044606 A1 3/2004 Buttridge et al.
2004/0057697 A1 3/2004 Renzi
2004/0058705 A1 3/2004 Morgan
2004/0066031 A1 4/2004 Wong
2004/0069841 A1 4/2004 Wong
2004/0071333 A1 4/2004 Douglas et al.
2004/0075754 A1 4/2004 Nakajima et al.
2004/0076320 A1 4/2004 Downs, Jr.
2004/0078299 A1 4/2004 Down-Logan
2004/0080795 A1 4/2004 Bean et al.
2004/0089711 A1 5/2004 Sandru
2004/0093303 A1 5/2004 Picciallo
2004/0093305 A1 5/2004 Kight
2004/0103057 A1 5/2004 Melbert et al.
2004/0103296 A1 5/2004 Harp
2004/0109596 A1 6/2004 Doran
2004/0110975 A1 6/2004 Osinski et al.
2004/0111371 A1 6/2004 Friedman
2004/0117302 A1 6/2004 Weichert
2004/0122754 A1 6/2004 Stevens
2004/0133511 A1 7/2004 Smith et al.
2004/0133516 A1 7/2004 Buchanan et al.
2004/0138974 A1 7/2004 Shimamura
2004/0148235 A1 7/2004 Craig et al.
2004/0158549 A1 8/2004 Matena
2004/0165096 A1 8/2004 Maeno
2004/0170259 A1 9/2004 Park
2004/0184766 A1 9/2004 Kim et al.
2004/0201741 A1 10/2004 Ban
2004/0210515 A1 10/2004 Hughes
2004/0210523 A1 10/2004 Gains et al.
2004/0225604 A1 11/2004 Foss, Jr. et al.
2004/0228277 A1 11/2004 Williams
2004/0236647 A1 11/2004 Acharya
2004/0236688 A1 11/2004 Bozeman
2004/0240722 A1 12/2004 Tsuji et al.
2004/0245324 A1 12/2004 Chen
2004/0247199 A1 12/2004 Murai et al.
2004/0248600 A1 12/2004 Kim
2004/0252679 A1 12/2004 Williams
2004/0260636 A1 12/2004 Marceau
2004/0267666 A1 12/2004 Minami
2005/0001421 A1 1/2005 Luth et al.
2005/0010108 A1 1/2005 Rahn et al.
2005/0015332 A1 1/2005 Chen
2005/0015342 A1 1/2005 Murata et al.
2005/0021466 A1 1/2005 Buchanan et al.
2005/0030388 A1 2/2005 Stavely et al.
2005/0033645 A1 2/2005 Duphily
2005/0033685 A1 2/2005 Reyes
2005/0033690 A1 2/2005 Antognini et al.
2005/0033695 A1 2/2005 Minowa
2005/0035193 A1 2/2005 Gustin et al.
2005/0038746 A1 2/2005 Latimer et al.
2005/0038754 A1 2/2005 Geist
2005/0044042 A1 2/2005 Mendiola
2005/0044577 A1 2/2005 Jerding
2005/0049950 A1 3/2005 Johnson
2005/0071283 A1 3/2005 Randle et al.
2005/0075969 A1 4/2005 Nielson et al.
2005/0075974 A1 4/2005 Turgeon
2005/0077351 A1 4/2005 De Jong
2005/0078336 A1 4/2005 Ferlitsch
2005/0080725 A1 4/2005 Pick
2005/0082364 A1 4/2005 Alvarez et al.
2005/0086140 A1 4/2005 Ireland
2005/0086168 A1 4/2005 Alvarez
2005/0089209 A1 4/2005 Stefanuk
2005/0091161 A1 4/2005 Gustin
2005/0096992 A1 5/2005 Geisel
2005/0097019 A1 5/2005 Jacobs
2005/0097046 A1 5/2005 Singfield
2005/0097050 A1 5/2005 Orcutt
2005/0108164 A1 5/2005 Salafia
2005/0108168 A1 5/2005 Halpin
2005/0115110 A1 6/2005 Dinkins
2005/0125338 A1 6/2005 Tidwell et al.
2005/0125360 A1 6/2005 Tidwell et al.
2005/0127160 A1 6/2005 Fujikawa
2005/0131820 A1 6/2005 Rodriguez
2005/0143136 A1 6/2005 Lev et al.
2005/0149436 A1 7/2005 Elterich
2005/0168566 A1 8/2005 Tada
2005/0171899 A1 8/2005 Dunn
2005/0171907 A1 8/2005 Lewis
2005/0177494 A1 8/2005 Kelly et al.
2005/0177499 A1 8/2005 Thomas
2005/0177510 A1 8/2005 Hilt et al.
2005/0177518 A1 8/2005 Brown
2005/0182710 A1 8/2005 Anderson
2005/0188306 A1 8/2005 Mackenzie
2005/0203430 A1 9/2005 Williams et al.
2005/0205661 A1 9/2005 Taylor
2005/0209961 A1 9/2005 Michelsen
2005/0213805 A1 9/2005 Blake et al.
2005/0216410 A1 9/2005 Davis et al.
2005/0218209 A1 10/2005 Heilper et al.
2005/0220324 A1 10/2005 Klein et al.
2005/0228733 A1 10/2005 Bent et al.
2005/0244035 A1 11/2005 Klein et al.
2005/0252955 A1 11/2005 Sugai
2005/0267843 A1 12/2005 Acharya et al.
2005/0268107 A1 12/2005 Harris et al.
2005/0269412 A1 12/2005 Chiu
2005/0273368 A1 12/2005 Hutten et al.
2005/0278250 A1 12/2005 Zair
2005/0281448 A1 12/2005 Lugg
2005/0281471 A1 12/2005 LeConte
2005/0281474 A1 12/2005 Huang
2005/0289030 A1 12/2005 Smith
2005/0289059 A1 12/2005 Brewington et al.
2005/0289182 A1 12/2005 Pandian et al.

(56) References Cited

U.S. PATENT DOCUMENTS

2006/0002426 A1 1/2006 Madour
2006/0004660 A1 1/2006 Pranger
2006/0015450 A1 1/2006 Guck et al.
2006/0015733 A1 1/2006 O'Malley et al.
2006/0017752 A1 1/2006 Kurzweil et al.
2006/0025697 A1 2/2006 Kurzweil
2006/0039628 A1 2/2006 Li et al.
2006/0039629 A1 2/2006 Li et al.
2006/0041506 A1 2/2006 Mason et al.
2006/0045321 A1 3/2006 Yu
2006/0045374 A1 3/2006 Kim et al.
2006/0045379 A1 3/2006 Heaney, Jr. et al.
2006/0047593 A1 3/2006 Naratil
2006/0049242 A1 3/2006 Mejias et al.
2006/0053056 A1 3/2006 Alspach-Goss
2006/0059085 A1 3/2006 Tucker
2006/0064368 A1 3/2006 Forte
2006/0080245 A1 4/2006 Bahl
2006/0085357 A1 4/2006 Pizarro
2006/0085516 A1 4/2006 Farr et al.
2006/0102704 A1 5/2006 Reynders
2006/0103893 A1 5/2006 Azimi et al.
2006/0106691 A1 5/2006 Sheaffer
2006/0106717 A1 5/2006 Randle
2006/0108168 A1 5/2006 Fischer et al.
2006/0110063 A1 5/2006 Weiss
2006/0112013 A1 5/2006 Maloney
2006/0115110 A1 6/2006 Rodriguez
2006/0115141 A1 6/2006 Koakutsu et al.
2006/0118613 A1 6/2006 McMann
2006/0124730 A1 6/2006 Maloney
2006/0144924 A1 7/2006 Stover
2006/0144937 A1 7/2006 Heilper et al.
2006/0144950 A1 7/2006 Johnson
2006/0159367 A1 7/2006 Zeineh et al.
2006/0161499 A1 7/2006 Rich et al.
2006/0161501 A1 7/2006 Waserstein
2006/0164682 A1 7/2006 Lev
2006/0166178 A1 7/2006 Driedijk
2006/0167818 A1 7/2006 Wentker et al.
2006/0181614 A1 8/2006 Yen et al.
2006/0182331 A1 8/2006 Gilson et al.
2006/0182332 A1 8/2006 Weber
2006/0186194 A1 8/2006 Richardson et al.
2006/0202014 A1 9/2006 VanKirk et al.
2006/0206506 A1 9/2006 Fitzpatrick
2006/0208059 A1 9/2006 Cable et al.
2006/0210138 A1 9/2006 Hilton et al.
2006/0212391 A1 9/2006 Norman et al.
2006/0212393 A1 9/2006 Brown
2006/0214940 A1 9/2006 Kinoshita
2006/0215204 A1 9/2006 Miyamoto et al.
2006/0215230 A1 9/2006 Borrey et al.
2006/0221198 A1 10/2006 Fry et al.
2006/0222260 A1 10/2006 Sambongi et al.
2006/0229976 A1 10/2006 Jung
2006/0229986 A1 10/2006 Corder
2006/0238503 A1 10/2006 Smith
2006/0242062 A1 10/2006 Peterson
2006/0242063 A1 10/2006 Peterson
2006/0248009 A1 11/2006 Hicks et al.
2006/0249567 A1 11/2006 Byrne
2006/0273165 A1 12/2006 Swift et al.
2006/0274164 A1 12/2006 Kimura et al.
2006/0279628 A1 12/2006 Fleming
2006/0282383 A1 12/2006 Doran
2006/0289630 A1 12/2006 Updike et al.
2006/0291744 A1 12/2006 Ikeda et al.
2007/0002157 A1 1/2007 Shintani et al.
2007/0013721 A1 1/2007 Vau et al.
2007/0016796 A1 1/2007 Singhal
2007/0019243 A1 1/2007 Sato
2007/0022053 A1 1/2007 Waserstein
2007/0027802 A1 2/2007 VanDeburg et al.
2007/0030357 A1 2/2007 Levien et al.
2007/0031022 A1 2/2007 Frew
2007/0038561 A1 2/2007 Vancini et al.
2007/0041629 A1 2/2007 Prakash et al.
2007/0050292 A1 3/2007 Yarbrough
2007/0053574 A1 3/2007 Verma et al.
2007/0058851 A1 3/2007 Quine
2007/0063016 A1 3/2007 Myatt
2007/0064991 A1 3/2007 Douglas et al.
2007/0065143 A1 3/2007 Didow et al.
2007/0075772 A1 4/2007 Kokubo
2007/0076940 A1 4/2007 Goodall et al.
2007/0076941 A1 4/2007 Carreon et al.
2007/0077921 A1 4/2007 Hayashi
2007/0080207 A1 4/2007 Williams
2007/0082700 A1 4/2007 Landschaft
2007/0084911 A1 4/2007 Crowell
2007/0086642 A1 4/2007 Foth
2007/0086643 A1 4/2007 Spier
2007/0094088 A1 4/2007 Mastie
2007/0094140 A1 4/2007 Riney et al.
2007/0100748 A1 5/2007 Dheer
2007/0110277 A1 5/2007 Hayduchok et al.
2007/0118472 A1 5/2007 Allen-Rouman et al.
2007/0122024 A1 5/2007 Haas et al.
2007/0124241 A1 5/2007 Newton
2007/0127805 A1 6/2007 Foth et al.
2007/0129955 A1 6/2007 Dalmia
2007/0131758 A1 6/2007 Mejias et al.
2007/0136198 A1 6/2007 Foth et al.
2007/0140545 A1 6/2007 Rossignoli
2007/0140594 A1 6/2007 Franklin
2007/0143208 A1 6/2007 Varga
2007/0150337 A1 6/2007 Hawkins et al.
2007/0154098 A1 7/2007 Geva et al.
2007/0156438 A1 7/2007 Popadic et al.
2007/0168265 A1 7/2007 Rosenberger
2007/0168283 A1 7/2007 Alvarez et al.
2007/0171288 A1 7/2007 Inoue
2007/0172107 A1 7/2007 Jones et al.
2007/0172148 A1 7/2007 Hawley
2007/0175977 A1 8/2007 Bauer et al.
2007/0179883 A1 8/2007 Questembert
2007/0183000 A1 8/2007 Eisen et al.
2007/0183741 A1 8/2007 Lerman et al.
2007/0194102 A1 8/2007 Cohen
2007/0198432 A1 8/2007 Pitroda et al.
2007/0203708 A1 8/2007 Polycn et al.
2007/0206877 A1 9/2007 Wu et al.
2007/0208816 A1 9/2007 Baldwin et al.
2007/0214086 A1 9/2007 Homoki
2007/0217669 A1 9/2007 Swift et al.
2007/0233525 A1 10/2007 Boyle
2007/0233585 A1 10/2007 Simon et al.
2007/0235518 A1 10/2007 Mueller et al.
2007/0235520 A1 10/2007 Smith et al.
2007/0241179 A1 10/2007 Davis
2007/0244782 A1 10/2007 Chimento
2007/0246525 A1 10/2007 Smith et al.
2007/0251992 A1 11/2007 Sharma et al.
2007/0255652 A1 11/2007 Tumminaro
2007/0255653 A1 11/2007 Tumminaro
2007/0255662 A1 11/2007 Tumminaro
2007/0258634 A1 11/2007 Simonoff
2007/0262137 A1 11/2007 Brown
2007/0262148 A1 11/2007 Yoon
2007/0268540 A1 11/2007 Gaspardo et al.
2007/0271182 A1 11/2007 Prakash et al.
2007/0278286 A1 12/2007 Crowell et al.
2007/0288380 A1 12/2007 Starrs
2007/0288382 A1 12/2007 Narayanan et al.
2007/0295803 A1 12/2007 Levine et al.
2007/0299928 A1 12/2007 Kohli et al.
2008/0002911 A1 1/2008 Eisen
2008/0010204 A1 1/2008 Rackley, III et al.
2008/0021802 A1 1/2008 Pendelton
2008/0040280 A1 2/2008 Davis et al.
2008/0046362 A1 2/2008 Easterly
2008/0052182 A1 2/2008 Marshall
2008/0059376 A1 3/2008 Davis

(56) References Cited

U.S. PATENT DOCUMENTS

2008/0063253 A1 3/2008 Wood
2008/0065524 A1 3/2008 Matthews et al.
2008/0068674 A1 3/2008 McIntyre
2008/0071679 A1 3/2008 Foley
2008/0071721 A1 3/2008 Wang
2008/0073423 A1 3/2008 Heit et al.
2008/0080760 A1 4/2008 Ronca
2008/0086420 A1 4/2008 Gilder et al.
2008/0086421 A1 4/2008 Gilder
2008/0086770 A1 4/2008 Kulkarni et al.
2008/0091599 A1 4/2008 Foss, Jr.
2008/0097899 A1 4/2008 Jackson et al.
2008/0097907 A1 4/2008 Till et al.
2008/0103790 A1 5/2008 Abernethy
2008/0103967 A1 5/2008 Ackert et al.
2008/0113674 A1 5/2008 Baig
2008/0114739 A1 5/2008 Hayes
2008/0115066 A1 5/2008 Pavley et al.
2008/0116257 A1 5/2008 Fickling
2008/0117991 A1 5/2008 Peddireddy
2008/0119178 A1 5/2008 Peddireddy
2008/0133411 A1 6/2008 Jones et al.
2008/0140579 A1 6/2008 Sanjiv
2008/0147549 A1 6/2008 Ruthbun
2008/0155672 A1 6/2008 Sharma
2008/0156438 A1 7/2008 Stumphauzer et al.
2008/0162319 A1 7/2008 Breeden et al.
2008/0162350 A1 7/2008 Allen-Rouman et al.
2008/0162371 A1 7/2008 Rampell et al.
2008/0177659 A1 7/2008 Lacey et al.
2008/0180750 A1 7/2008 Feldman
2008/0205751 A1 8/2008 Mischler
2008/0208727 A1 8/2008 McLaughlin et al.
2008/0214180 A1 9/2008 Cunningham et al.
2008/0219543 A1 9/2008 Csulits
2008/0245869 A1 10/2008 Berkun et al.
2008/0247629 A1 10/2008 Gilder
2008/0247655 A1 10/2008 Yano
2008/0249931 A1 10/2008 Gilder et al.
2008/0249951 A1 10/2008 Gilder et al.
2008/0262950 A1 10/2008 Christensen et al.
2008/0262953 A1 10/2008 Anderson
2008/0275821 A1 11/2008 Bishop et al.
2008/0301441 A1 12/2008 Calman et al.
2008/0304769 A1 12/2008 Hollander et al.
2008/0316542 A1 12/2008 Mindrum et al.
2009/0024520 A1 1/2009 Drory et al.
2009/0046938 A1 2/2009 Yoder
2009/0060396 A1 3/2009 Blessan et al.
2009/0066987 A1 3/2009 Inokuchi
2009/0094148 A1 4/2009 Gilder et al.
2009/0108080 A1 4/2009 Meyer
2009/0110281 A1 4/2009 Hirabayashi
2009/0141962 A1 6/2009 Borgia et al.
2009/0164350 A1 6/2009 Sorbe et al.
2009/0164370 A1 6/2009 Sorbe et al.
2009/0166406 A1 7/2009 Pigg et al.
2009/0167870 A1 7/2009 Caleca et al.
2009/0171795 A1 7/2009 Clouthier et al.
2009/0171819 A1 7/2009 Emde et al.
2009/0171825 A1 7/2009 Roman
2009/0173781 A1 7/2009 Ramachadran
2009/0185241 A1 7/2009 Nepomniachtchi
2009/0185737 A1 7/2009 Nepomniachtchi
2009/0185738 A1 7/2009 Nepomniachtchi
2009/0190823 A1 7/2009 Walters
2009/0192938 A1 7/2009 Amos
2009/0212929 A1 8/2009 Drory et al.
2009/0236413 A1 9/2009 Mueller et al.
2009/0240620 A1 9/2009 Kendrick et al.
2009/0252437 A1 10/2009 Li
2009/0254447 A1 10/2009 Blades
2009/0257641 A1 10/2009 Liu et al.
2009/0263019 A1 10/2009 Tzadok et al.
2009/0271287 A1 10/2009 Halpern
2009/0281904 A1 11/2009 Pharris
2009/0284637 A1 11/2009 Parulski et al.
2009/0290751 A1 11/2009 Ferman et al.
2009/0292628 A1 11/2009 Dryer et al.
2009/0313167 A1 12/2009 Dujari et al.
2009/0319425 A1 12/2009 Tumminaro et al.
2009/0327129 A1 12/2009 Collas et al.
2010/0007899 A1 1/2010 Lay
2010/0027679 A1 2/2010 Sunahara et al.
2010/0030687 A1 2/2010 Panthaki et al.
2010/0047000 A1 2/2010 Park et al.
2010/0057578 A1 3/2010 Blair et al.
2010/0061446 A1 3/2010 Hands et al.
2010/0078471 A1 4/2010 Lin et al.
2010/0082468 A1 4/2010 Low et al.
2010/0082470 A1 4/2010 Walach
2010/0165015 A1 7/2010 Barkley et al.
2010/0198733 A1 8/2010 Gantman et al.
2010/0225773 A1 9/2010 Lee
2010/0226559 A1 9/2010 Najari et al.
2010/0260408 A1 10/2010 Prakash et al.
2010/0262522 A1 10/2010 Anderson et al.
2010/0274693 A1 10/2010 Bause et al.
2010/0312705 A1 12/2010 Caruso et al.
2011/0016084 A1 1/2011 Mundy et al.
2011/0069180 A1 3/2011 Nijemcevic et al.
2011/0106675 A1 5/2011 Perlman
2011/0112967 A1 5/2011 Anderson et al.
2011/0170740 A1 7/2011 Coleman
2011/0191161 A1 8/2011 Dai
2011/0251956 A1 10/2011 Cantley et al.
2011/0280450 A1 11/2011 Nepomniachtchi et al.
2011/0285874 A1 11/2011 Showering et al.
2011/0310442 A1 12/2011 Popadic et al.
2012/0045112 A1 2/2012 Lundblad et al.
2012/0047070 A1 2/2012 Pharris
2012/0062732 A1 3/2012 Marman et al.
2012/0089514 A1 4/2012 Kraemling et al.
2012/0099792 A1 4/2012 Chevion et al.
2012/0185383 A1 7/2012 Atsmon
2012/0185388 A1 7/2012 Pranger
2012/0229872 A1 9/2012 Dolev
2013/0021651 A9 1/2013 Popadic et al.
2013/0120595 A1 5/2013 Roach et al.
2013/0198071 A1 8/2013 Jurss
2013/0223721 A1 8/2013 Nepomniachtchi et al.
2013/0297353 A1 11/2013 Strange
2014/0032406 A1 1/2014 Roach et al.
2014/0067661 A1 3/2014 Elischer
2014/0236820 A1 8/2014 Carlton et al.
2014/0279453 A1 9/2014 Belchee et al.
2015/0039528 A1 2/2015 Minogue et al.
2015/0090782 A1 4/2015 Dent

FOREIGN PATENT DOCUMENTS

KR 20040076131 A 8/2004
WO WO 98/37655 A1 8/1998
WO WO 01/61436 A2 8/2001
WO WO 2006/075967 A1 7/2006
WO WO 2006/086768 A2 8/2006
WO WO 2006/136958 A2 12/2006

OTHER PUBLICATIONS

"Adjusting Brightness and Contrast", www.eaglesoftware.com/adjustin.htm, retrieved on May 4, 2009 (4 pgs).
"Best practices for producing quality digital image files," Digital Images Guidelines, http://deepblue.lib.umich.edu/bitstream/2027.42/40247/1/Images-Best_Practice.pdf, downloaded 2007 (2 pgs).
"Chapter 7 Payroll Programs," Uniform Staff Payroll System, http://www2.oecn.k12.oh.us/www/ssdt/usps/usps_user_guide_005.html, Cited in U.S. Pat. No. 7,900,822, as dated 2007 (9 pgs).
"Check 21—The check is not in the post", RedTitan Technology 2004 http://www.redtitan.com/check21/htm (3 pgs).
"Check 21 Solutions," Columbia Financial International, Inc. http://www.columbiafinancial.us/check21/solutions.htm, Cited in U.S. Pat. No. 7,900,822, as dated 2007 (8 pgs).

(56) References Cited

OTHER PUBLICATIONS

"Check Fraud: A Guide to Avoiding Losses", All Net, http://all.net/books/audit/checkfraud/security.htm, Cited in U.S. Pat. No. 7,900,822, as dated 2007 (1 pg).
"Compliance with Regulation CC", http./www/federalreserve.gov/Pubs/regcc/regcc.htm, Jan. 24, 2006 (6 pgs).
"Customer Personalized Bank Checks and Address Labels" Checks Your Way Inc., http://www.checksyourway.com/htm/web_pages/faq.htm, Cited in U.S. Pat. No. 7,900,822, as dated 2007 (6 pgs).
"Direct Deposit Application for Payroll", Purdue University, Business Office Form 0003, http://purdue.edu/payroll/pdf/directdepositapplication.pdf, Jul. 2007 (2 pgs).
"Direct Deposit Authorization Form", www.umass.edu/humres/library/DDForm.pdf, May 2003 (3 pgs).
"Direct Deposit," University of Washington, http://www.washington.edu/admin/payroll/directdeposit.html, Cited in U.S. Pat. No. 7,900,822, as dated 2007 (3 pgs).
"Electronic Billing Problem: The E-check is in the mail" American Banker—vol. 168, No. 95, May 19, 2003 (4 pgs).
"Frequently Asked Questions" Bank of America, http://www/bankofamerica.com/deposits/checksave/index.cfm?template-lc_faq_bymail, Cited in U.S. Pat. No. 7,900,822, as dated 2007 (2 pgs).
"Full Service Direct Deposit", www.nonprofitstaffing.com/images/upload/dirdepform.pdf. Cited in U.S. Pat. No. 7,900,822, as dated 2001, (2 pgs).
"How to Digitally Deposit a Check Image", Smart Money Daily, Copyright 2008 (5 pgs).
"ImageNet Mobile Deposit Provides Convenient Check Deposit and Bill Pay to Mobile Consumers," Miteksystems, 2008 (2 pgs).
"It's the easiest way to Switch banks", LNB, http://www.inbky.com/pdf/LNBswitch-kit10-07.pdf Cited in U.S. Pat. No. 7,996,316, as dated 2007 (7 pgs).
"Lesson 38—More Bank Transactions", Turtle Soft, http://www.turtlesoft.com/goldenseal-software-manual.lesson38.htm, Cited in U.S. Pat. No. 7,900,822, as dated 2007 (8 pgs).
"Middleware", David E. Bakken, Encyclopedia of Distributed Computing, Kluwer Academic Press, 2001 (6 pgs).
"Mitek Systems Announces Mobile Deposit Application for Apple iPhone," http://prnewswire.com/cgi-bin/stories/pl?ACCT=104&Story=/www/story/10-01- . . . , Nov. 25, 2008 (2 pgs).
"Personal Finance", PNC, http://www.pnc.com/webapp/unsec/productsandservice.do?sitearea=/PNC/home/personal/account+services/quick+switch/quick+switch+faqs, Cited in U.S. Pat. No. 7,900,822, as dated 2007 (12 pgs).
"Refractive index" Wikipedia, the free encyclopedia; http://en.wikipedia.org./wiki/refractiveindex.com Oct. 16, 2007 (4 pgs).
"Remote check deposit is the answer to a company's banking problem," Daily Breeze, Torrance, CA, Nov. 17, 2006, 2 pgs.
"Remote Deposit Capture", Plante & Moran, http://plantemoran.com/industries/fincial/institutions/bank/resources/community+bank+advisor/2007+summer+issue/remote+deposit+capture.htm, Cited in U.S. Pat. No. 7,900,822, as dated 2007 (3 pgs).
"Remote Deposit" National City, http://www.nationalcity.com/smallbusiness/cashmanagement/remotedeposit/default.asp; Cited in U.S. Pat. No. 7,900,822, as dated 2007 (1 pg).
"Save on ATM Fees", RedEye Edition, Chicago Tribune, Chicago, IL Jun. 30, 2007 (2 pgs).
"SNB Check Capture: SmartClient User's Guide," Nov. 2006, 21 pgs.
"Switching Made Easy," Bank of North Georgia, http://www.banknorthgeorgia.com/cmsmaster/documents/286/documents616.pdf, 2007 (7 pgs).
"Two Words Every Business Should Know: Remote Deposit," Canon, http://www.rpsolutions.com/rpweb/pdfs/canon_rdc.pdf, 2005 (7 pgs).
"Virtual Bank Checks", Morebusiness.com, http://www.morebusiness.com/running_yourbusiness/businessbits/d908484987.brc, Cited in U.S. Pat. No. 7,900,822, as dated 2007 (3 pgs).
"WallStreetGrapevine.com" Stocks on the Rise: JADG, BKYI, MITK; Mar. 3, 2008 (4 pgs).
"What is check Fraud", National Check Fraud Center, http://www.ckfraud.org/ckfraud.html, Cited in U.S. Pat. No. 7,900,822, as dated 2007 (12 pgs).
Affinity Federal Credit Union, "Affinity Announces Online Deposit," Aug. 4, 2005 (1 pg).
Albrecht, W. Steve, "Check Kiting: Detection, Prosecution and Prevention," The FBI Law Enforcement Bulletin, Nov. 1, 1993 (6 pgs).
Alves, Vander and Borba, Paulo; "Distributed Adapters Pattern: A Design for Object-Oriented Distributed Applications"; First Latin American Conference on Pattern Languages of Programming; Oct. 2001; pp. 132-142; Rio de Janeiro, Brazil (11 pgs).
Amber Avalona-Butler/Paraglide, "At Your Service: Best iPhone Apps for Military Lifestyle," Jul. 9, 2010 (2 pgs).
Anderson, Milton M. "FSML and Echeck", Financial Services Technology Consortium, 1999 (17 pgs).
Archive Index Systems; Panini My Vision X-30 or VX30 or X30 © 1994-2008 Archive Systems, Inc. P./O. Box 40135 Bellevue, WA USA 98015 (2 pgs).
Associate of German Banks, SEPA 2008: Uniform Payment Instruments for Europe, Berlin, Cited in U.S. Pat. No. 7,900,822, as dated Jul. 2007, Bundesverbankd deutscher banker ev (42 pgs).
Automated Merchant Systems, Inc., "Electronic Check Conversion," http://www.automatedmerchant.com/electronic_check_conversion.cfm, 2006, downloaded Oct. 18, 2006 (3 pgs).
Bank Systems & Technology, Untitled Article, May 1, 2006, http://www.banktech.com/showarticle.jhtml? articleID=187003126, "Are you Winning in the Payment World?" (4 pgs).
BankServ, "DepositNow: What's the difference?" Cited in U.S. Pat. No. 7,970,677, as dated 2006, (4 pgs).
BankServ, Product Overview, http://www.bankserv.com/products/remotedeposit.htm, Cited in U.S. Pat. No. 7,970,677, as dated 2006, (3 pgs).
Blafore, Bonnie "Lower Commissions, Fewer Amenities", Better Investing, Madison Heights: Feb. 2003, vol. 52, Iss 6, (4 pgs).
BLM Technologies, "Case Study: Addressing Check 21 and RDC Error and Fraud Threats," Remote Deposit Capture News Articles from Jun. 11, 2007, Retrieved from http://www.remotedepositcapture.com/News/june_11_2007.htm on Feb. 19, 2008 (5 pgs).
Blue Mountain Consulting, from URL: www.bluemontainconsulting.com, Cited in U.S. Pat. No. 7,900,822, as dated Apr. 26, 2006 (3 pgs).
Board of Governors of the federal reserve system, "Report to the Congress on the Check Clearing for the 21st Century Act of 2003" Apr. 2007, Submitted to Congress pursuant to section 16 of the Check Clearing for the 21st Century Act of 2003, (59 pgs).
Bruene, Jim; "Check Free to Enable In-Home Remote Check Deposit for Consumers and Small Business", NetBanker.Com, Financial Insite, Inc., http://www.netbanker.com/2008/02/checkfree_to_enableinhome_rem.html, Feb. 5, 2008 (3 pgs).
Bruene, Jim; "Digital Federal Credit Union and Four Others Offer Consumer Remote Deposit Capture Through EasCorp", NetBanker—Tracking Online Finance, www.netbanker.com/2008/04/digital_federal_credit_union_a.html, Apr. 13, 2008 (3 pgs).
Bruno, M., "Instant Messaging," Bank Technology News, Dec. 2002 (3 pgs).
Burnett, J. "Depository Bank Endorsement Requirements," BankersOnline.com, http://www.bankersonline.com/cgi-bin/printview/printview.pl, Jan. 6, 2003 (3 pgs).
Canon, ImageFormula CR25/CR-55, "Improve Your Bottom Line with Front-Line Efficiencies", 0117W117, 1207-55/25-1 OM-BSP Cited in U.S. Pat. No. 7,949,587 as dated 2007. (4 pgs).
Carrubba, P. et al., "Remote Deposit Capture: A White Paper Addressing Regulatory, Operational and Risk Issues," NetDeposit Inc., 2006 (11 pgs).
Century Remote Deposit High-Speed Scanner User's Manual Release 2006, (Century Manual), Century Bank, 2006, (32 pgs).
Chiang, Chuck, The Bulletin, "Remote banking offered", http://bendbulletin.com/apps/pbcs.dll/article?AID=/20060201/BIZ0102/602010327&templ . . ., May 23, 2008 (2 pgs).
CNN.com/technology, "Scan, deposit checks from home", www.cnn.com/2008ITECH/biztech/02/07/check.scanning.ap/index.html, Feb. 7, 2008 (3 pgs).

(56) References Cited

OTHER PUBLICATIONS

Constanzo, Chris, "Remote Check Deposit: Wells Captures a New Checking Twist", Bank Technology News Article—May 2005, www.americanbanker.com/btn_article.html?id=20050502YQ50FSYG (2 pgs).
Craig, Ben, "Resisting Electronic Payment Systems: Burning Down the House?", Federal Reserve Bank of Cleveland, Jul. 1999 (4 pgs).
Creativepaymentsolutions.com, "Creative Payment Solutions—Websolution," www.creativepaymentsolution.com/cps/financialservices/websolution/default.html , Copyright 2008, Creative Payment Solutions, Inc. (1 pg).
Credit Union Journal, "The Ramifications of Remote Deposit Capture Success", www.cuiournal.com/orintthis.html?id=20080411EODZT57G, Apr. 14, 2008 (1 pg).
Credit Union Journal, "AFCU Averaging 80 DepositHome Transactions Per Day", Credit Union Journal, Aug. 15, 2005 (1 pg).
Credit Union Management, "When You wish Upon an Imaging System . . . the Right Selection Process can be the Shining Star," Credit Union Management, Aug. 1993, printed from the internet at <http://search.proquest.com/docview/227756409/14138420743684F7722/15?ac countid=14 . . . >, on Oct. 19, 2013 (11 pgs).
DCU Member's Monthly—Jan. 2008, "PC Deposit—Deposit Checks from Home!", http://www.mycreditunionnewsletter.com/dcu/0108/page1. html, Copyright 2008 Digital Federal Credit Union (2 pgs).
De Jesus, A. et al., "Distributed Check Processing in a Check 21 Environment: An educational overview of the opportunities and challenges associated with implementing distributed check imaging and processing solutions," Panini, 2004, pp. 1-22.
De Queiroz, Ricardo et al., "Mixed Raster Content (MRC) Model for Compound Image Compression", 1998 (14 pgs).
Debello, James et al., "RDM and Mitek Systems to Provide Mobile Check Deposit," Mitek Systems, Inc., San Diego, California and Waterloo, Ontario, (Feb. 24, 2009), 2 pgs.
DeYoung, Robert; "The Financial Performance of Pure Play Internet Banks"; Federal Reserve Bank of Chicago Economic Perspectives; 2001; pp. 60-75; vol. 25, No. 1 (16pgs).
Dias, Danilo et al., "A Model for the Electronic Representation of Bank Checks", Brasilia Univ. Oct. 2006 (5 pgs).
Digital Transactions News, "An ACH-Image Proposal for Check Roils Banks and Networks" May 26, 2006 (3 pgs).
Dinan, R.F. et al., "Image Plus High Performance Transaction System", IBM Systems Journal, 1990 vol. 29, No. 3 (14 pgs).
Doermann, David et al., "Progress in Camera-Based Document Image Analysis," Proceedings of the Seventh International Conference on Document Analysis and Recognition (ICDAR 2003) 0-7695-1960-1/03, 2003 IEEE (11 pages).
Duvall, Mel, "Remote Deposit Capture," Baseline, vol. 1, Issue 70, Mar. 2007, 2 pgs.
eCU Technologies, "Upost Remote Deposit Solution," Retrieved from the internet https://www.eutechnologies.com/products/upost.html, downloaded 2009 (1 pg).
EFT Network Unveils FAXTellerPlus, EFT Network, Inc., www.eftnetwork.com, Jan. 13, 2009 (2 pgs).
ElectronicPaymentProviders, Inc., "FAQs: ACH/ARC, CheckVerification/Conversion/Guarantee, RCK Check Re-Presentment," http://www.useapp.com/faq.htm, downloaded Oct. 18, 2006 (3 pgs).
Federal Check 21 Act, "New Check 21 Act effective Oct. 28, 2004: Bank No Longer Will Return Original Cancelled Checks," Consumer Union's FAQ's and Congressional Testimony on Check 21, www.consumerlaw.org.initiatives/content/check21_content.html, Cited in U.S. Pat. No. 7,873,200, as dated Dec. 2005 (20 pgs).
Federal Reserve Board, "Check Clearing for the 21st Century Act", FRB, http://www.federalreserve.gov/paymentsystems/truncation/, Mar. 1, 2006 (1 pg).
Federal Reserve System, "12 CFR, Part 229 [Regulation CC]: Availability of Funds and Collection of Checks," Federal Registrar, Apr. 28, 1997, pp. 1-50.
Federal Reserve System, "Part IV, 12 CFR Part 229 [Regulation CC]: Availability of Funds and Collection of Checks; Final Rule," Federal Registrar, vol. 69, No. 149, Aug. 4, 2004, pp. 47290-47328.
Fest, Glen., "Patently Unaware" Bank Technology News, Apr. 2006, Retrieved from the internet at URL:http://banktechnews.com/article.html?id=2006403T7612618 (5 pgs).
Fidelity Information Services, "Strategic Vision Embraces Major Changes in Financial Services Solutions: Fidelity's long-term product strategy ushers in new era of application design and processing," Insight, 2004, pp. 1-14.
Fisher, Dan M., "Home Banking in the 21st Century: Remote Capture Has Gone Retail", May 2008 (4 pgs).
Furst, Karen et al., "Internet Banking: Developments and Prospects", Economic and Policy Analysis Working Paper 2000-9, Sep. 2000 (60 pgs).
Garry, M., "Checking Options: Retailers face an evolving landscape for electronic check processing that will require them to choose among several scenarios," Supermarket News, vol. 53, No. 49, 2005 (3 pgs).
German Shegalov, Diplom-Informatiker, "Integrated Data, Message, and Process Recovery for Failure Masking in Web Services", Dissertation Jul. 2005 (146 pgs).
Gupta, Amar et al., "An Integrated Architecture for Recognition of Totally Unconstrained Handwritten Numerals", WP#3765, Jan. 1993, Productivity from Information Technology "Profit" Research Initiative Sloan School of Management (20 pgs).
Gupta, Maya R. et al., "OCR binarization and image pre-processing for searching historical documents," Pattern Recognition, vol. 40, No. 2, Feb. 2007, pp. 389-397.
Hale, J., "Picture this: Check 21 uses digital technology to speed check processing and shorten lag time," Columbus Business First, http://columbus.bizjournals.com/columbus/stories/2005/03/14focus1.html, downloaded 2007 (3 pgs).
Hartly, Thomas, "Banks Check Out New Image", Business First, Buffalo: Jul. 19, 2004, vol. 20, Issue 43, (3 pgs).
Heckenberg, D. "Using Mac OS X for Real-Time Image Processing" Oct. 8, 2003 (15 pgs).
Herley, Cormac, "Efficient Inscribing of Noisy Rectangular Objects in Scanned Images," 2004 International Conference on Image Processing, 4 pages.
Hildebrand, C. et al., "Electronic Money," Oracle, http://www.oracle.com/oramag/profit/05-feb/p15financial.html, 2005, downloaded Oct. 18, 2006 (5 pgs).
Hillebrand, G., "Questions and Answers About the Check Clearing for the 21st Century Act, 'Check 21," ConsumersUnion.org, http://www.consumersunion.org/finance/ckclear1002.htm, Jul. 27, 2004, downloaded Oct. 18, 2006 (6 pgs).
Iida, Jeanne, "The Back Office: Systems—Image Processing Rolls on as Banks ReapBenefits," American Banker, Jul. 19, 1993, printed from the internet at <http://search.proquest.com/docview/292903245/14138420743684F7722/14?ac countid=14 . . .>, on Oct. 19, 2013 (3 pgs).
Image Master, "Photo Restoration: We specialize in digital photo restoration and photograph repair of family pictures", http://www.imphotorepair.com, Cited in U.S. Pat. No. 7,900,822, as downloaded Apr. 2007 (1 pg).
Investment Systems Company, "Portfolio Accounting System," 2000, pp. 1-32.
JBC, "What is a MICR Line?," eHow.com, retrieved from http://www.ehow.com/about_4684793_what-micr-line.html on May 4, 2009 (2 pgs).
Johnson, Jennifer J., Secretary of the Board; Federal Reserve System, 12 CFR Part 229, Regulation CC; "Availability of Funds and Collection of Checks". Cited in U.S. Pat. No. 7,900,822, as dated 2009, (89 pgs).
Kendrick, Kevin B., "Check Kiting, Float for Purposes of Profit," Bank Security & Fraud Prevention, vol. 1, No. 2, 1994 (3 pgs).
Kiser, Elizabeth K.; "Modeling the Whole Firm: The Effect of Multiple Inputs and Financial Intermediation on Bank Deposit Rates;" FEDS Working Paper No. 2004-07; Jun. 3, 2003; pp. 1-46 (46 pgs).
Knestout, Brian P. et al., "Banking Made Easy" Kiplinger's Personal Finance Washington, Jul. 2003, vol. 57, Iss 7 (5 pgs).

(56) References Cited

OTHER PUBLICATIONS

Kornai Andras et al., "Recognition of Cursive Writing on Personal Checks", Proceedings of International Workshop on the Frontiers in Handwriting Recognition, Cited in U.S. Pat. No. 7,900,822, as dated Sep. 1996, (6 pgs).
Levitin, Adam J., Remote Deposit Capture: A Legal and Transactional Overview, Banking Law Journal, p. 115, 2009 (RDC).
Masonson, L., "Check Truncation and ACH Trends—Automated Clearing Houses", healthcare financial management associate, http://www.findarticles.com/p/articles/mLm3276/is_n7_v47/ai_14466034/print, 1993 (2 pgs).
Matthews, Deborah, "Advanced Technology Makes Remote Deposit Capture Less Risky," Indiana Bankers Association, Apr. 2008 (2 pgs).
Metro 1 Credit Union, "Remote Banking Services," hltp://ww\\i.metro1cu.org/metro1cu/remote.html, downloaded Apr. 17, 2007 (4 pgs).
Mitek systems, "Imagenet Mobile Deposit", San Diego, CA, downloaded 2009 (2 pgs).
Mitek Systems: Mitek Systems Launches First Mobile Check Deposit and Bill Pay Application, San Diego, CA, Jan. 22, 2008 (3 pgs).
Mohl, Bruce, "Banks Reimbursing ATM Fee to Compete With Larger Rivals", Boston Globe, Boston, MA, Sep. 19, 2004 (3 pgs).
Moreau, T., "Payment by Authenticated Facsimile Transmission: a Check Replacement Technology for Small and Medium Enterprises," CONNOTECH Experts-conseils, Inc., Apr. 1995 (31 pgs).
Nelson, B. et al., "Remote deposit capture changes the retail landscape," Northwestern Financial Review, http://findarticles.com/p/articles/miqa3799/is 200607/ai_n16537250, 2006 (3 pgs).
NetBank, Inc., "Branch Out: Annual Report 2004," 2004 (150 pgs).
NetBank, Inc., "Quick Post: Deposit and Payment Forwarding Service," 2005 (1 pg).
NetDeposit Awarded Two Patents for Electronic Check Process, NetDeposit, Jun. 18, 2007, (1 pg).
Nixon, Julie et al., "Fiserv Research Finds Banks are Interested in Offering Mobile Deposit Capture as an," Fiserv, Inc. Brookfield, Wis., (Business Wire), (Feb. 20, 2009), 2 pgs.
Online Deposit: Frequently Asked Questions, http://www.depositnow.com/faq.html, Copyright 2008 (1 pg).
Onlinecheck.com/Merchant Advisors, "Real-Time Check Debit", Merchant Advisors: Retail Check Processing Check Conversion, http://www.onlinecheck/wach/rcareal.htm, Cited in U.S. Pat. No. 7,900,822, as dated 2006 (3 pgs).
Oxley, Michael G., from committee on Financial Services; "Check Clearing for the 21st Century Act", 108th Congress, 1st Session House of Representatives report 108-132, Jun. 2003 (20 pgs).
Oxley, Michael G., from the committee of conference; "Check Clearing for the 21st Century Act" 108th Congress, 1st Session Senate report 108-291, Oct. 1, 2003 (27 pgs).
Palacios, Rafael et al., "Automatic Processing of Brazilian Bank Checks". Cited in U.S. Pat. No. 7,900,822, as dated 2002 (28 pgs).
Patterson, Scott "USAA Deposit@Home—Another WOW moment for Net Banking", NextCU.com, Jan. 26, 2007 (5 pgs).
Public Law 108-100, 108 Congress; "An Act Check Clearing for the 21st Century Act", Oct. 28, 2003, 117 STAT. 1177 (18 pgs).
Rao, Bharat; "The Internet and the Revolution in Distribution: A Cross-Industry Examination"; Technology in Society; 1999; pp. 287-306; vol. 21, No. 3 (20 pgs).
Remotedepositcapture, URL:www.remotedepositcapture.com, Cited in U.S. Pat. No. 7,900,822, as dated 2006 (5 pgs).
RemoteDepositCapture.com, "PNC Bank to Offer Ease of Online Deposit Service Integrated with QuickBooks to Small Businesses", Remote Deposit Capture News Articles from Jul. 24, 2006, (2 pgs).
RemoteDepositCapture.com, Remote Deposit Capture News Articles from Jul. 6, 2006, "BankServ Announces New Remote Deposit Product Integrated with QuickBooks" (3 pgs).
Remotedepsitcapture.com, LLC, "Remote Deposit Capture Overview," ROC Overview, http://remotedepositcapture.com/overview/RDC_overview.htm, Cited in U.S. Pat. No. 7,900,822, as dated Mar. 12, 2007 (4 pgs).
Richey, J. C. et al., "EE 4530 Check Imaging," Nov. 18, 2008 (10 pgs).
Ritzer, J.R. "Hinky Dinky helped spearhead POS, remote banking movement", Bank Systems and Equipment, vol. 21, No. 12, Dec. 1984 (1 pg).
Rivlin, Alice M. et al., Chair, Vice Chair—Board of Governors, Committee on the Federal Reserve in the Payments Mechanism—Federal Reserve System, "The Federal Reserve in the Payments Mechanism", Jan. 1998 (41 pgs).
Rose, Sarah et al., "Best of the We: The Top 50 Financial Websites", Money, New York, Dec. 1999, vol. 28, Iss. 12 (8 pgs).
Shelby, Hon. Richard C. (Committee on Banking, Housing and Urban Affairs); "Check Truncation Act of 2003", calendar No. 168, 108th Congress, 1st Session Senate report 108-79, Jun. 2003 (27 pgs).
SoyBank Anywhere, "Consumer Internet Banking Service Agreement," Dec. 6, 2004 (6 pgs).
Teixeira, D., "Comment: Time to Overhaul Deposit Processing Systems," American Banker, Dec. 10, 1998, vol. 163, No. 235, p. 15 (3 pgs).
Thailandguru.com: How and where to Pay Bills @ www.thailandguru.com/paying-bills.html, © 1999-2007 (2 pgs).
The Automated Clearinghouse, "Retail Payment Systems; Payment Instruments Clearing and Settlement: The Automated Clearinghouse (ACH)", www.ffiec.gov/ffiecinfobase/booklets/retailretail_02d.html, Cited in U.S. Pat. No. 7,900,822, as dated Dec. 2005 (3 pgs).
The Green Sheet 2.0: Newswire, "CO-OP adds home deposit capabilities to suite of check imaging products", www.greensheet.com/newswire.php?newswire_id=8799, Mar. 5, 2008 (2 pgs).
Tygar, J.D., Atomicity in Electronic Commerce, in ACM Networker, 2:2, Apr./May 1998 (12 pgs).
Valentine, Lisa, "Remote Deposit Capture Hot Just Got Hotter," ABA Banking Journal, Mar. 2006, p. 1-9.
Wade, Will, "Early Notes: Updating Consumers on Check 21" American Banker Aug. 10, 2004 (3 pgs).
Wallison, Peter J., "Wal-Mart Case Exposes Flaws in Banking-Commerce Split", American Banker, vol. 167. No. 8, Jan. 11, 2002 (3 pgs).
Wells Fargo 2005 News Releases, "The New Wells Fargo Electronic Deposit Services Break Through Banking Boundaries in the Age of Check 21", San Francisco Mar. 28, 2005, www.wellsfargo.com/press/3282005_check21Year=2005 (1 pg).
Wells Fargo Commercial, "Remote Deposit", www.wellsfargo.com/com/treasury mgmtlreceivables/electronic/remote deposit, Copyright 2008 (1 pg).
White, J.M. et al., "Image Thresholding for Optical Character Recognition and Other Applications Requiring Character Image Extraction", IBM J. Res. Development, Jul. 1983, vol. 27, No. 4 (12 pgs).
Whitney et al., "Reserve Banks to Adopt DSTU X9.37-2003 Format for Check 21 Image Services", American Bankers Association, May 18, 2004, http://www.aba/com/NR/rdonlyres/CBDC1 A5C-43E3-43CC-B733-BE417C638618/35930/DSTUFormat.pdf (2 pages).
Wikipedia @, "Remote Deposit," http://en.wikipedia.org/wiki/Remote_deposit, 2007 (3 pgs).
Windowsfordevices.com, "Software lets camera phone users deposit checks, pay bills", www.windowsfordevices.com/news/NS3934956670.html, Jan. 29, 2008 (3 pgs).
Wolfe, Daniel, "Check Image Group Outlines Agenda," American Banker, New York, N.Y.: Feb. 13, 2009, vol. 174, Iss. 30, p. 12. (2 pgs).
Woody Baird Associated Press, "Pastor's Wife got Scammed—She Apparently Fell for Overseas Money Scheme," The Commercial Appeal, Jul. 1, 2006, p. A. 1.
Zhang, C.Y., "Robust Estimation and Image Combining" Astronomical Data Analysis Software and Systems IV, ASP Conference Series, 1995 (5 pgs).

(56) References Cited

OTHER PUBLICATIONS

Zions Bancorporation, "Moneytech, the technology of money in our world: Remote Deposit," http://www.bankjunior.com/pground/moneytech/remote_deposit.jsp, 2007 (2 pgs).
Application as filed on Apr. 3, 2008 for U.S. Appl. No. 12/062,143 (27 pgs).
Application as filed on Aug. 19, 2010 for U.S. Appl. No. 12/859,741 (235 pgs).
Application as filed on Aug. 21, 2008 for U.S. Appl. No. 12/195,723 (38 pgs).
Application as filed on Aug. 21, 2009 for U.S. Appl. No. 12/545,127 (45 pgs).
Application as filed on Aug. 28, 2009 for U.S. Appl. No. 12/549,443 (41 pgs).
Application as filed on Dec. 20, 2006 for U.S. Appl. No. 11/613,656 (21 pgs).
Application as filed on Dec. 29, 2005 for U.S. Appl. No. 11/321,025 (19 pgs).
Application as filed on Dec. 30, 2010 for U.S. Appl. No. 12/982,494 (280 pgs).
Application as filed on Dec. 30, 2010 for U.S. Appl. No. 12/982,561 (275 pgs).
Application as filed on Dec. 30, 2010 for U.S. Appl. No. 12/982,578 (274 pgs).
Application as filed on Dec. 30, 2010 for U.S. Appl. No. 12/982,594 (275 pgs).
Application as filed on Feb. 15, 2012 for U.S. Appl. No. 13/397,405 (19 pgs).
Application as filed on Feb. 18, 2009 for U.S. Appl. No. 12/388,005 (37 pgs).
Application as filed on Jan. 7, 2013 for U.S. Appl. No. 13/735,678 (30 pgs).
Application as filed on Jul. 13, 2006 for U.S. Appl. No. 11/487,537 (23 pgs).
Application as filed on Jul. 27, 2009 for U.S. Appl. No. 12/509,613 (48 pgs).
Application as filed on Jul. 27, 2009 for U.S. Appl. No. 12/509,680 (41 pgs).
Application as filed on Jun. 11, 2008 for U.S. Appl. No. 12/137,051 (29 pgs).
Application as filed on Jun. 8, 2011 for U.S. Appl. No. 13/155,976 (352 pgs).
Application as filed on Jun. 8, 2011 for U.S. Appl. No. 13/156,007 (356 pgs).
Application as filed on Jun. 8, 2011 for U.S. Appl. No. 13/156,018 (353 pgs).
Application as filed on Mar. 15, 2007 for U.S. Appl. No. 11/686,924 (34 pgs).
Application as filed on Mar. 15, 2007 for U.S. Appl. No. 11/686,928 (36 pgs).
Application as filed on Mar. 15, 2013 for U.S. Appl. No. 13/842,112 (62 pgs).
Application as filed on Mar. 4, 2009 for U.S. Appl. No. 12/397,671 (40 pgs).
Application as filed on Mar. 4, 2009 for U.S. Appl. No. 12/397,930 (37 pgs).
Application as filed on May 10, 2007 for U.S. Appl. No. 11/747,222 (35 pgs).
Application as filed on Oct. 17, 2008 for U.S. Appl. No. 12/253,278 (42 pgs).
Application as filed on Oct. 17, 2013 for U.S. Appl. No. 14/056,565 (53 pgs).
Application as filed on Oct. 23, 2007 for U.S. Appl. No. 11/876,925 (36 pgs).
Application as filed on Oct. 23, 2007 for U.S. Appl. No. 11/877,335 (29 pgs).
Application as filed on Oct. 25, 2007 for U.S. Appl. No. 11/923,839 (22 pgs).
Application as filed on Oct. 29, 2007 for U.S. Appl. No. 11/926,388 (23 pgs).
Application as filed on Oct. 30, 2007 for U.S. Appl. No. 11/928,297 (26 pgs).
Application as filed on Oct. 31, 2006 for U.S. Appl. No. 11/590,974 (31 pgs).
Application as filed on Oct. 31, 2006 for U.S. Appl. No. 11/591,008 (27 pgs).
Application as filed on Oct. 31, 2006 for U.S. Appl. No. 11/591,227 (58 pgs).
Application as filed on Oct. 31, 2006 for U.S. Appl. No. 11/591,273 (56 pgs).
Application as filed on Oct. 31, 2007 for U.S. Appl. No. 11/930,537 (27 pgs).
Application as filed on Oct. 31, 2007 for U.S. Appl. No. 11/931,670 (47 pgs).
Application as filed on Oct. 8, 2007 for U.S. Appl. No. 11/868,878 (30 pgs).
Application as filed on Oct. 8, 2007 for U.S. Appl. No. 11/868,884 (30 pgs).
Application as filed on Sep. 28, 2007 for U.S. Appl. No. 11/864,569 (35 pgs).
Application as filed on Sep. 8, 2008 for U.S. Appl. No. 12/205,996 (30 pgs).
Claims as filed on Apr. 1, 2013 for U.S. Appl. No. 13/854,521 (5 pgs).
Claims as filed on Apr. 3, 2008 for U.S. Appl. No. 12/062,163 (3 pgs).
Claims as filed on Apr. 3, 2008 for U.S. Appl. No. 12/062,175 (3 pgs).
Claims as filed on Apr. 30, 2013 for U.S. Appl. No. 13/874,145 (5 pgs).
Claims as filed on Aug. 19, 2010 for U.S. Appl. No. 12/859,752 (5 pgs).
Claims as filed on Aug. 21, 2009 for U.S. Appl. No. 12/545,127 (5 pgs).
Claims as filed on Dec. 15, 2011 for U.S. Appl. No. 13/327,478 (4 pgs).
Claims as filed on Dec. 20, 2006 for U.S. Appl. No. 11/613,671 (3 pgs).
Claims as filed on Dec. 20, 2012 for U.S. Appl. No. 13/722,576 (4 pgs).
Claims as filed on Dec. 29, 2005 for U.S. Appl. No. 11/320,998 (3 pgs).
Claims as filed on Dec. 29, 2005 for U.S. Appl. No. 11/321,027 (3 pgs).
Claims as filed on Dec. 8, 2010 for U.S. Appl. No. 12/963,513 (7 pgs).
Claims as filed on Feb. 12, 2013 for U.S. Appl. No. 13/765,412 (1 pg).
Claims as filed on Feb. 15, 2012 for U.S. Appl. No. 13/397,437 (6 pgs).
Claims as filed on Feb. 16, 2011 for U.S. Appl. No. 13/028,477 (3 pgs).
Claims as filed on Feb. 16, 2015 for U.S. Appl. No. 14/623,179 (10 pgs).
Claims as filed on Feb. 19, 2013 for U.S. Appl. No. 13/770,048 (4 pgs).
Claims as filed on Feb. 3, 2016 for U.S. Appl. No. 15/014,918 (5 pgs).
Claims as filed on Jan. 20, 2011 for U.S. Appl. No. 13/010,644 (9 pgs).
Claims as filed on Jan. 31, 2011 for U.S. Appl. No. 13/017,865 (11 pgs).
Claims as filed on Jun. 12, 2015 for U.S. Appl. No. 14/738,340 (4 pgs).
Claims as filed on Jun. 13, 2012 for U.S. Appl. No. 13/495,971 (36 pgs).
Claims as filed on Jun. 20, 2013 for U.S. Appl. No. 13/922,686 (7 pgs).
Claims as filed on Jun. 9, 2014 for U.S. Appl. No. 14/299,456 (36 pgs).
Claims as filed on Mar. 15, 2007 for U.S. Appl. No. 11/686,925 (5 pgs).

(56) References Cited

OTHER PUBLICATIONS

Claims as filed on Mar. 20, 2014 for U.S. Appl. No. 14/220,799 (1 pg). (Not 25th).
Claims as filed on Mar. 25, 2014 for U.S. Appl. No. 14/224,944 (4 pgs).
Claims as filed on Mar. 25, 2014 for U.S. Appl. No. 14/225,090 (1 pg).
Claims as filed on Mar. 3, 2014 for U.S. Appl. No. 14/195,482 (4 pgs).
Claims as filed on May 10, 2007 for U.S. Appl. No. 11/747,223 (4 pgs).
Claims as filed on May 18, 2011 for U.S. Appl. No. 13/110,077 (9 pgs).
Claims as filed on May 2, 2011 for U.S. Appl. No. 13/098,566 (10 pgs).
Claims as filed on Nov. 20, 2012 for U.S. Appl. No. 13/682,268 (4 pgs).
Claims as filed on Oct. 16, 2014 for U.S. Appl. No. 14/516,335 (4 pgs).
Claims as filed on Oct. 16, 2014 for U.S. Appl. No. 14/516,350 (4 pgs).
Claims as filed on Oct. 16, 2014 for U.S. Appl. No. 14/516,364 (4 pgs).
Claims as filed on Oct. 23, 2007 for U.S. Appl. No. 11/877,382 (6 pgs).
Claims as filed on Oct. 24, 2008 for U.S. Appl. No. 12/257,471 (4 pgs).
Claims as filed on Oct. 31, 2006 for U.S. Appl. No. 11/590,963 (3 pgs).
Claims as filed on Oct. 31, 2006 for U.S. Appl. No. 11/590,995 (3 pgs).
Claims as filed on Oct. 31, 2006 for U.S. Appl. No. 11/590,998 (4 pgs).
Claims as filed on Oct. 31, 2006 for U.S. Appl. No. 11/591,131 (4 pgs).
Claims as filed on Oct. 31, 2007 for U.S. Appl. No. 11/931,804 (4 pgs).
Claims as filed on Oct. 8, 2007 for U.S. Appl. No. 11/868,878 (4 pgs).
Claims as filed on Sep. 14, 2012 for U.S. Appl. No. 13/619,026 (3 pgs).
Claims as filed on Sep. 2, 2008 for U.S. Appl. No. 12/202,781 (4 pgs).
Claims as filed on Sep. 8, 2008 for U.S. Appl. No. 12/206,001 (3 pgs).
Claims as filed on Sep. 8, 2008 for U.S. Appl. No. 12/206,007 (3 pgs).
Office Action from corresponding U.S. Appl. No. 11/877,307 dated Apr. 25, 2011 (39 pgs).
Office Action from corresponding U.S. Appl. No. 11/877,307 dated Dec. 8, 2009 (29 pgs).
Final Office Action from corresponding U.S. Appl. No. 11/877,307 dated Jun. 10, 2009 (20 pgs).
Final Office Action from corresponding U.S. Appl. No. 11/877,307 dated May 13, 2010 (31 pgs).
Office Action from corresponding U.S. Appl. No. 11/877,307 dated Sep. 26, 2008 (13 pgs).
Office Action from corresponding U.S. Appl. No. 11/877,367 dated Apr. 29, 2011 (75 pgs).
Office Action from corresponding U.S. Appl. No. 11/877,367 dated Dec. 7, 2009 (47 pgs).
Office Action from corresponding U.S. Appl. No. 11/877,367 dated Jun. 23, 2009 (24 pgs).
Office Action from corresponding U.S. Appl. No. 11/877,367 dated May 13, 2010 (48 pgs).
Office Action from corresponding U.S. Appl. No. 11/877,367 dated Nov. 9, 2011 (9 pgs).
Office Action from corresponding U.S. Appl. No. 11/877,367 dated Oct. 2, 2008 (14 pgs).
Office Action from corresponding U.S. Appl. No. 11/877,382 dated Dec. 19, 2014 (26 pgs).
Office Action from corresponding U.S. Appl. No. 11/877,382 dated Apr. 26, 2011 (39 pgs).
Office Action from corresponding U.S. Appl. No. 11/877,382 dated Jun. 25, 2009 (25 pgs).
Office Action from corresponding U.S. Appl. No. 11/877,382 dated May 14, 2010 (30 pgs).
Office Action from corresponding U.S. Appl. No. 11/877,382 dated Nov. 9, 2011 (9 pgs).
Office Action from corresponding U.S. Appl. No. 11/877,382 dated Sep. 13, 2010 (33 pgs).
Office Action from corresponding U.S. Appl. No. 11/877,382 dated Sep. 30, 2008 (14 pgs).
Final Office Action from corresponding U.S. Appl. No. 11/877,382 dated Sep. 9, 2015 (10 pgs).
Office Action from corresponding U.S. Appl. No. 11/877,404 dated Apr. 27, 2011 (14 pgs).
Office Action from corresponding U.S. Appl. No. 11/877,404 dated May 14, 2010 (23pgs).
Office Action from corresponding U.S. Appl. No. 11/877,404 dated May 28, 2009 (16pgs).
Office Action from corresponding U.S. Appl. No. 11/877,404 dated Oct. 1, 2008 (11 pgs).
Office Action from corresponding U.S. Appl. No. 11/877,404 dated Sep. 10, 2010 (27pgs).
Notice of Allowance from corresponding U.S. Appl. No. 13/327,478 dated Sep. 8, 2015 (11 pgs).
Notice of Allowance from corresponding U.S. Appl. No. 13/327,478 dated Jan. 12, 2015 (14 pgs).
Office Action from corresponding U.S. Appl. No. 13/327,478 dated Jul. 16, 2014 (13 pgs).
Patent Disclaimer for U.S. Pat. No. 8,699,779, filed on Mar. 4, 2019, 2 pgs.
Patent Disclaimer for U.S. Pat. No. 8,977,571, filed on Feb. 20, 2019, 2 pgs.
Patent Disclaimer for U.S. Pat. No. 9,336,517, filed on Mar. 4, 2019, 2 pgs.
Patent Disclaimer for U.S. Pat. No. 9,818,090, filed on Feb. 20, 2019, 2 pgs.
CBM2019-00002 U.S. Pat. No. 9,818,090, United Services Automobile Association (USAA)'s Patent Owner Preliminary Response, dated Feb. 20, 2019, 75 pgs.
CBM2019-00002 U.S. Pat. No. 9,818,090, Declaration of Tim Crews in Support of Patent Owner Preliminary Response, dated Feb. 20, 2019, 8 pgs.
CBM2019-00002 U.S. Pat. No. 9,818,090, Declaration of Matthew Calman in Support of Patent Owner Preliminary Response, dated Feb. 20, 2019, 14 pgs.
CBM2019-00002 U.S. Pat. No. 9,818,090, Katie Knight Videotape Deposition Transcript, dated Feb. 8, 2019, 27 pgs.
CBM2019-00002 U.S. Pat. No. 9,818,090, Peter Alexander, Ph.D., Oral and Videotaped Deposition, dated Jan. 23, 2019, 27 pgs.
CBM2019-00002 U.S. Pat. No. 9,818,090, United Services Automobile Association (USAA)'s Updated Exhibit List, dated Mar. 19, 2019, 8 pgs.
CBM2019-00003 U.S. Pat. No. 9,336,517, United Services Automobile Association (USAA)'s Patent Owner Preliminary Response, dated Mar. 4, 2019, 91 pgs.
CBM2019-00003 U.S. Pat. No. 8,699,779, Declaration of Matthew Calman in Support of Patent Owner Preliminary Response, dated Mar. 4, 2019, 15 pgs.
CBM2019-00003 U.S. Pat. No. 9,336,517, Katie Knight Videotape Deposition Transcript, dated Feb. 8, 2019, 27 pgs.
CBM2019-00003 U.S. Pat. No. 9,336,517, Peter Alexander, Ph.D., Oral and Videotaped Deposition, dated Jan. 23, 2019, 27 pgs.
CBM2019-00003 U.S. Pat. No. 9,336,517, United Services Automobile Association (USAA)'s Updated Exhibit List Pursuant to 37 CFR 42.63(e), dated Mar. 19, 2019, 8 pgs.
CBM2019-00003 U.S. Pat. No. 9,336,517, Petitioner's Reply Brief to Patent Owner Preliminary Response Pursuant to Authorization Provided in Paper No. 14, dated Apr. 10, 2019, 10 pgs.

(56) References Cited

OTHER PUBLICATIONS

CBM2019-00004 U.S. Pat. No. 8,977,571, Declaration of Tim Crews in Support of Patent Owner Preliminary Response, dated Feb. 20, 2019, 8 pgs.
CBM2019-00004 U.S. Pat. No. 8,977,571, United Services Automobile Association (USAA)'s Patent Owner Preliminary Response, dated Feb. 20, 2019, 99 pgs.
CBM2019-00004 U.S. Pat. No. 8,977,571, Declaration of Matthew Calman in Support of Patent Owner Preliminary Response, dated Feb. 20, 2019, 14 pgs.
CBM2019-00004 U.S. Pat. No. 8,977,571, United Services Automobile Association (USAA)'s Updated Exhibit List Pursuant to 37 CFR 43.63(e), dated Mar. 19, 2019, 8 pgs.
CBM2019-00005 U.S. Pat. No. 8,699,779, United Services Automobile Association's (USAA)'s Patent Owner Preliminary Response, dated Mar. 4, 2019, 103 pgs.
CBM2019-00005 U.S. Pat. No. 8,699,779, Katie Knight Videotape Deposition Transcript, dated Feb. 8, 2019, 27 pgs.
CBM2019-00005 U.S. Pat. No. 8,699,779 Matthew A. Calman Declaration, dated Mar. 4, 2019, 15 pgs.
CBM2019-00005 U.S. Pat. No. 8,699,779 Peter Alexander, Ph.D., Oral and Videotaped Deposition, dated Jan. 23, 2019, 27 pgs.
CBM2019-00027 U.S. Pat. No. 9,224,136 Declaration of Peter Alexander, Ph.D., dated Mar. 28, 2019, 147 pgs.
CBM2019-00027 U.S. Pat. No. 9,224,136 Petition for Covered Business Method Review of Claims 1-3, 5-9, 11-16 and 18 of U.S. Pat. No. 9,224,136, dated Mar. 28, 2019, 93 pgs.
CBM2019-00027 U.S. Pat. No. 9,224,136 Notice of Filing Date Accorded to Petition and Time for Filing Patent Owner Preliminary Response, dated Apr. 8, 2019, 3 pgs.
CBM2019-00028 U.S. Pat. No. 10,013,681, Plaintiff United Services Automobile Association (USAA) Preliminary Claim Constructions and Extrinsic Evidence, dated Mar. 15, 2019, 74 pgs.
CBM2019-00028 U.S. Pat. No. 10,013,681, Declaration of Peter Alexander, Ph.D., dated Mar. 28, 2019, 94 pgs.
CBM2019-00028 U.S. Pat. No. 10,013,681, Petition for Covered Business Method Review of Claims 1-30 of U.S. Pat. No. 10,013,681, dated Mar. 28, 2019, 99 pgs.
CBM2019-00028 U.S. Pat. No. 10,013,681, Petitioner's Updated Exhibit List (as of Apr. 1, 2019) for U.S. Pat. No. 10,013,681, dated Apr. 1, 2019, 5 pgs.
CBM2019-00028 U.S. Pat. No. 10,013,681, Notice of Filing Date Accorded to Petition and Time for Filing Patent owner Preliminary Response for U.S. Pat. No. 10,013,681, dated Apr. 8, 2019, 3 pgs.
CBM2019-00029 U.S. Pat. No. 10,013,605, Declaration of Peter Alexander, Ph.D., dated Mar. 28, 2019, 76 pgs.
CBM2019-00029 U.S. Pat. No. 10,013,605, Petition for Covered Business Method Review of Claims 1-3, 5-14, 16-29 of U.S. Pat. No. 10,013,605, dated Mar. 28, 2019, 88 pgs.
CBM2019-00029 U.S. Pat. No. 10,013,605, Plaintiff United Services Automobile Association (USAA) Preliminary Claim Constructions and Extrinsic Evidence, dated Mar. 15, 2019, 74 pgs.
IPR2019-00815 U.S. Pat. No. 9,818,090, Petition for *Inter Parties* Review of Claims 109 of U.S. Pat. No. 9,818,090, dated Mar. 20, 2019, 56 pgs.
IPR2019-00815 U.S. Pat. No. 9,818,090, Declaration of Peter Alexander, PhD. as filed in the IPR on Mar. 20, 2019, 99 pgs.
IPR2019-00815 U.S. Pat. No. 9,818,090, Notice of Filing Date Accorded to Petition and Time for Filing Patent Owner Preliminary Response, dated Mar. 27, 2019, 5 pgs.
IPR2019-00815 U.S. Pat. No. 9,818,090, Exhibit B Proposed Claim Constructions for the '571, '090, '779 and '517 Patents, filed on Feb. 28, 2019, 10 pgs.
ABA Routing System Transit Number, Wikipedia, dated Sep. 27, 2006, 3pgs.
Accredited Standards Committee Technical Report TR 33-2006, dated Aug. 28, 2006, 75 pgs.
ANS X9.100-140-2004, "Specification for an Image Replacement document—IRD", American Standard for Financial Services, Oct. 1, 2004, 15 pgs.
ANSI News, Check 21 Goes Into Effect Oct. 28, 2004, dated Oct. 25, 2004, 1 pg.
ANSI, "Return Reasons for Check Image Exchange of IRDS", dated May 6, 2016, 23 pgs.
ANSI, "Specifications for Electronic Exchange of Check and Image Data", dated Jul. 11, 2006, 230 pgs.
ANSI X9.7-1999(R2007), Bank Check Background and Convenience Amount Field Specification, dated Jul. 11, 2007, 86 pgs.
ASCX9, "Specification for Electronic Exchange of Check and Image Data", date Mar. 31, 2003. 156 pgs.
Bankers' Hotline, "Training Page: Learning the Bank Numbering System", Copyright 2004, 2 pgs.
BrainJar Validation Algorithms, archived on Mar. 16, 2016 from BrainJar.com, 2 pgs.
Canon White Paper, "Two Words Every Business Should Know—Remote Deposit", dated 2005, 7 pgs.
CBR online, "Diebold launches ATM depository technology", Oct. 4, 2007, 5 pgs.
Cheq Information Technology White Paper, "Teller Scanner Performance and Scanner Design: Camera Position Relative to the Feeder", dated 2005, 7 pgs.
De Jesus, Angie et al., "Distributed Check Processing in a Check 21 Environment", dated Nov. 2004, 22 pgs.
Federal Reserve Adoption of DSTU X9.37-2003, Image Cash Letter Customer Documentation Version 1.8, dated Oct. 1, 2008, 48 pgs.
Fielding, R. et al, "RFC-2616—Hypertext Transfer Protocol", Network Working Group, The Internet Society copyright 1999, 177 pgs.
Hill, Simon, "From J-Phone to Lumina 1020: A Complete History of the Camera Phone", dated Aug. 11, 2013, 19 pgs.
Instrument—Definition from the Merriam-Webster Online Dictionary, dated Mar. 2, 2019, 1 pg.
Instrument—Definition of instrument from the Oxford Dictionaries (British & World English), dated Jul. 2, 2017, 44 pgs.
iPhone Application Programming Guide Device Support, dated Apr. 26, 2009, 7 pgs.
iPhone Announces the New iPhone 3gs—The Fastest, Most Powerful iPhone Yet, Press Release dated Jun 8, 2009, 4 pgs.
Klein, Robert, Financial Services Technology, "Image Quality and Usability Assurance: Phase 1 Project", dated Jul. 23, 2004, 67 pgs.
Lange, Bill, "Combining Remote Capture and IRD Printing, A Check 21 Strategy for Community and Regional Banks", dated 2005, 25 pgs.
Lee, Jeanne, "Mobile Check Deposits: Pro Tips to Ensure They Go Smoothly", dated Feb. 19, 2016, 6 pgs.
Meara, Bob, "State of Remote Deposit Capture 2015: Mobile is the New Scanner", Dated May 26, 2015, obtained from the Internet at: https://www.celent.com/insights/57842967, 3 pgs.
Meara, Bob, "State of Remote Deposit Capture 2015 Mobile is the New Scanner", dated May 2015, 56 pgs.
Meara, Bob,"USAA's Mobile Remote Deposit Capture", dated Jun. 26, 2009, 2 pgs.
Mitek's Mobile Deposit Processes More Than Two Billion Checks, $1.5 Trillion in Cumulative Check Value, dated Mar. 18, 2018, 2 pgs.
Mitek, "Video Release—Mitek MiSnap ™ Mobile Auto Capture Improves Mobile Deposit® User Experience at Ten Financial Institutions", dated Jul. 15, 2014, 2 pgs.
NCR, Mobile Remote Deposit Capture (RDC), copyright 2011, 8 pgs.
Nokia N90 Review Digital Trends, dated Feb. 11, 2019, obtained from the Internet at: https://www.digitaltrends.com/cell-phone-reviews/nokia-n90-review/, 11 pgs.
Nokia N95 8GB User Guide, copyright 2009, (from the Wells Fargo Bank, N.A. IPR2019-00815, filed on Mar. 20, 2019), Part 1 of 3, 67 pgs.
Nokia N95 8GB User Guide, copyright 2009, (from the Wells Fargo Bank, N.A. IPR2019-00815, filed on Mar. 20, 2019), Part 2 of 3, 60 pgs.
Nokia N95 8GB User Guide, copyright 2009, (from the Wells Fargo Bank, N.A. IPR2019-00815, filed on Mar. 20, 2019), Part 3 of 3, 53 pgs.
Patel, Kunur, Ad Age, "How Mobile Technology is Changing Banking's Future", dated Sep. 21, 2009, 3 pgs.

(56) References Cited

OTHER PUBLICATIONS

Remote Deposit Capture Basic Requirements, dated Aug. 22, 2009, 1 pg.
Remote Deposit Capture.com Scanner Matrix, dated Oct. 21, 2011, 3 pgs.
Rowles, Tony, USSA-v. Wells Fargo No. 2:16-cv-245-JRGL e-mail correspondence dated Jan. 24, 2019, 2 pgs.
Sechrest, Stuart et al., "Windows XP Performance", Microsoft, dated Jun. 1, 2001, 20 pgs.
Spenser, Harvey, "White Paper Check 21 Controlling Image Quality at the Point of Capture", dated 2004, 7 pgs.
Timothy R. Crews list of Patents, printed from the United States Patent and Trademark Office on Feb. 13, 2019, 7 pgs.
Van Dyke, Jim, "2017 Mitek Mobile Deposit Benchmark Report", copyright 2017, 50 pgs.
WAUSAU, "Understanding Image Quality & Usability Within a New Environment", copyright 2019, 1 pg.
Whitney, Steve et al., "A Framework for Exchanging Image Returns", dated Jul. 2001, 129 pgs.
12 CRF § 229.51 and Appendix D to Part 229 (Jan. 1, 2005 edition), 3 pgs.
149 Cong. Rec. H9289, Oct. 8, 2003, 6 pgs.
*Apple Announces the New iPhone 3GS—The Fastest, Most Powerful iPhone Yet,* Jun. 8, 2009, located on the Internet at: http://www.apple.com.rensroom/2009/06/08Apple-Annpounces-the-New-iPhone-3GS-The Fastest-Most-Powerful-iPhone-Yet, 4 pgs.
Apple Reinvents the Phone with iPhone, Jan. 2007, located on the Internet at: https://www.apple.com/newsroom/2007/01/09Apple-Reinvents-the-Phone-with-iPhone/, 4 pgs.
Askey, *Canon EOS 40D Review* (pts.1,4,10), Digital Photography Review, located on the Internet at: : https://www.dpreview.com/reviews/canoneos40d, 24 pgs.
Askey, *Leica Digilux 2 Review* (pts.1,3,7), Digital Photography Review, May 20, 2004, located on the Internet at: : https://www.dpreview.com/reviews/leicadigilux2, 20 pgs.
Askey, Nikon D300 In-depth Review (pts.1,3,9), Digital Photography Review, Mar. 12, 2008, located on the Internet at: : https://www.preview.com/reviews/nikond300, 24 pgs.
Askey, *Panasonic Lumix DMC-L1 Review* (pts.1,3,7), Digital Photography Review, Apr. 11, 2007, located on the Internet at: https://www.dpreview.com/reviews/panasonicdmcl1, 24 pgs.
Askey, *Sony Cyber-shot DSC-R1 Review* (pts,1,3,7), Digital Photography Review, Dec. 6, 2005, located on the Internet at: http://www.dpreview.com.reviews/sonydscr1, 24 pgs.
*Automated Clearing Houses* (ACHs), Federal Reserve Bank of New York (May 2000) available at: https://www.newyorkfed.org/aboutthefed/fedpoint/fed31.html, (attached as Exhibit 12 from the Defendant Wells Fargo Bank, N.A.'s Answer dated Aug. 14, 2018), 4 pgs.
Berman, *How Hitchcock Turned a Small Budget Into a Great Triumph,* Time.com, Apr. 29, 2015, located on the Internet at: http://time.com/3823112/alfred-hitchcock-shadow-of-a-doubt, 1 pg.
*Big Red Book,* Adobe Systems Incorporated, copyright 2000, (attached as Exhibit 27 from the Defendant Wells Fargo Bank, N.A.'s Answer dated Aug. 14, 2018), 45 pgs.
Canon EOS 40D Digital Camera Instruction Manual, located on the Internet at: http://gdlp01.c-wss.com/gds/6/0900008236/01/EOS40D_HG_EN.pdf (attached as Exhibit 6 from the Defendant Wells Fargo Bank, N.A.'s Answer dated Aug. 14, 2018), 38 pgs.
Check Clearing for the 21st Century Act Foundation for Check 21 Compliance Training, Federal Financial Institutions Examination Council, (Oct. 16, 2004), available on the Internet at: https://web.archive.org/web/20041016100648/https://www.ffiec.gov/exam/check21/check21foundationdoc.htm, (excerpts attached as Exhibit 20 from the Defendant Wells Fargo Bank, N.A.'s Answer dated Aug. 14, 2018),11 pgs.
Chen, Brian et al., *iPhone 3GS Trounces Predecessors, Rivals in Web Browser Speed Test,* Wired, Jun. 24, 2009, located on the Internet at: www.wired.com/2009.3gs-speed/, 10 pgs.
"Clearing House Electronic Check Clearing System (CHECCS) Operating Rules," An IP.com Prior Art Database Technical Disclosure, Jul. 29, 2015 (35 pgs).
Defendant Wells Fargo Bank, N.A.'s Answer, Affirmative Defenses, and Counterclaims to Plaintiffs Complaint, dated Aug. 14, 2018, 64 pgs.
Declaration of Peter Alexander, Ph.D., CBM2019-0004, Nov. 8, 2018, 180 pgs.
"Deposit Now: Quick Start User Guide," BankServ, 2007, 29 pages.
Excerpts from American National Standard for Financial Services, ANS, X9.100-140-2004—Specifications for an Image Replacement Document—IRD, Oct. 1, 2004, 16 pgs.
"First Wireless Handheld Check and Credit Card Processing Solution Launched by Commericant®, MobileScape® 5000 Eliminates Bounced Checks, Enables Payments Everywhere," Business Wire, Mar. 13, 2016, 3 pages.
Gates, *A History of Wireless Standards, Wi-Fi Back to Basics,* Areohive Blog, Jul. 2015, located on the Internet at: http://blog.aerohine.com/a-history-of-wireless-standards, 5 pgs.
*Guides for Evaluation of Radio Transmission Technologies for IMT-2000,* dated 1997, ITU-R-M.1225, located on the Internet at: https://www.itu.int/dmspubrec/itu-r/rec/m/R-REC-M,1225-0-199702-I!!PDF-E.pdf, 60 pgs.
Helio Ocean User Manual, located on the Internet at: https://standupwireless.com/wp-content/uploads/2017/04/Manual_PANTECH_OCEAN.pdf (excerpts attached as Exhibit 10 from the Defendant Wells Fargo Bank, N.A.'s Answer dated Aug. 14, 2018), 76 pgs.
HTC Touch Diamond Manual, copyright 2008, (attached as Exhibit 11 from the Defendant Wells Fargo Bank, N.A.'s Answer dated Aug. 14, 2018), 257 pgs.
Humphrey, David B. and Hunt, Robert, "*Getting Rid of Paper: Savings From Check 21* ", Working Paper No. 12-12, Research Department, Federal Reserve Bank of Philadelphia, (May 2012), available on the Internet at: https://philadelphiafed.org/-/media/research-and-data/publications/working-papers/2012/wp12-12.pdf, (attached as Exhibit 14 from the Defendant Wells Fargo Bank, N.A.'s Answer dated Aug. 14, 2018), 29 pgs.
*iPhone Store Downloads Top 10 Million in First Weekend,* Jul. 14, 2008, located on the Internet at: iPhone Store Downloads Top 10 Million in First Weekend, Jul. 14, 2008, located on the Internet at: https://www.apple.com/newsroom/2008/07/14iPhone-App-Store-Downloads-Top-10-Million-in-First-Weekend/, 4 pgs.
Joinson et al., *Olympus E-30 Review* (pts.1,4,8), Digital Photography Review, Mar. 24, 2009, located on the Internet at: www.dpreview.com/reviews/olympus30, 26 pgs.
Knerr et al., *The A2iA Intercheque System: Courtesy Amount and Legal Amount Recognition for French Checks in Automated Bankcheck Processing 43-86,* Impedove et al. eds., 1997, 50 pgs.
Lacker, Jeffrey M., "*Payment System Disruptions and the Federal Reserve Following Sep. 11, 2001* ", The Federal Reserve Bank of Richmond, (Dec. 23, 2003) (attached as Exhibit 19 from the Defendant Wells Fargo Bank, N.A.'s Answer dated Aug. 14, 2018), 55 pgs.
LEICA DIGILUX 2 Instructions located on the Internet: http://www.overgaard.dk/pdf/d2_manual.pdf (attached as Exhibit 2 from the Defendant Wells Fargo Bank N.A.'s Answer dated Aug. 14, 2018), 95 pgs.
"Machine Accepts Bank Deposits", *New York Times,* Apr. 12, 1961, 1 pg.
MacKenzie, E., *Photography Made Easy,* copyright 1845, 80 pgs.
Motorola RAZR MAXX V6 User Manual, located on the Internet at: https://www.phonearena.com/phones/Motorola-RAZR-MAXX-V6_id1680, (attached as Exhibit 7 from the Defendant Wells Fargo Bank, N.A.'s Answer dated Aug. 14, 2018), 36 pgs.
Motomanual for Motorazr, located on the Internet at: https://www.cellphones.ca/downloads/phones/manuals/motorola-razr-v3xx-manual.pdf (excerpts attached as Exhibit 8 from the Defendant Wells Fargo Bank, N.A.'s Answer dated Aug. 14, 2018), 34 pgs.
Nikon Digital Camera D300 User's Manual, located on the Internet at: http://download.nikonimglib.com/archive2/

(56) References Cited

OTHER PUBLICATIONS iBuJv00Aj97i01y8BrK49XX0Ts69/D300, EU(En)04.pdf (attached as Exhibit 5 from the Defendant Wells Fargo Bank, N.A.'s Answer dated Aug. 14, 2018), 195 pgs.
Nokia N95 8GB User Guide, copyright 2009, located on the Internet at: https://www.nokia.com/en_int/phones/sites/default/files/user-guides/Nokia_N95_8GB_Extended_UG_en.pdf (excerpts attached as Exhibit 9 from the Defendant Wells Fargo Bank, N.A.'s Answer dated Aug. 14, 2018), 77 pgs.
"NOVA Enhances Electronic Check Service to Benefit Multi-Lane Retailers," Business Wire, Nov. 28, 2006, 2 pages.
Panasonic Operating Instructions for Digital Camera/Lens Kit Model No. DMC-L1K, https://www.panasonic.com/content/dam/Panasonic/support_manual/Digital_Still_Camera/English_01-vqt0-vqt2/vqt0w95_L1_oi.pdf (attached as Exhibit 4 from the Defendant Wells Fargo Back N.A.'s Answer dated Aug. 14, 2018), 129 pgs.
*POP, ARC and BOC—A Comparison,* Federal Reserve Banks, at 1(Jan. 7, 2009), available on the Internet at: https://web.archive.org/web/20090107101808/https://www.frbservices.org/files/eventseducation/ pdf/pop_arc_boc_comparison.pdf (attached as Exhibit 13 from the Defendant Wells Fargo Bank, N.A.'s Answer dated Aug. 14, 2018), 3 pgs.
Quinn and Roberds, *The Evolution of the Check as a Means of Payment: A Historical Survey,* Federal Reserve Bank of Atlanta, Economic Review, 2008, 30 pgs.
Petition filed by Wells Fargo Bank, N.A. for Covered Business Method Review of Claims 1-20 of U.S. Pat. No. 9,818,090, dated Nov. 8, 2018, 90 pgs.
Petition filed by Wells Fargo Bank, N.A. for Covered Business Method Review of Claims 1-20 of U.S. Pat. No. 9,336,517, dated Nov. 8, 2018, 98 pgs.
Petition filed by Wells Fargo Bank, N.A. for Covered Business Method Review of Claims 1-20 of U.S. Pat. No. 8,977,571, dated Nov. 8, 2018, 95 pgs.
Petition filed by Wells Fargo Bank, N.A. for Covered Business Method Review of Claims 1-23 of U.S. Pat. No. 8,699,779, dated Nov. 8, 2018, 101 pgs.
Rockwell, *The Megapixel Myth,* KenRickwell.com, 2008, located on the Internet at: http://kewrockwell.com.tech/mpmyth.htm, 6 pgs.
Shah, *Moore's Law,* Continuous Everywhere But Differentiable Nowhere, Feb. 12, 2009, located on the Internet at: http://samjshah.com/2009/02/24/morres-law/, 5 pgs.
Sony Digital Camera User's Guide/ Trouble Shooting Operating Instructions, copyright 2005, located on the Internet at: https://www.sony.co.uk/electronics/support/res/manuals/2654/26544941M.pdf (attached as Exhibit 3 from the Defendant Wells Fargo Bank N.A.'s Answer dated Aug. 14, 2018), 136 pgs.
Sumits, *Major Mobile Milestones—The Last 15 Years, and the Next Five,* Cisco Blogs, Feb. 3, 2016, located on the Internet at: https://blogs.cisco.com/sp/mobile-vni-major-mobile-milesrones-the-last15-years-and-the-next-five, 12 pgs.
Wausau Financial Systems, *Understanding Image Quality& Usability Within a New Environment,* 2006, 22 pgs.
"Exchangeable image file format for digital still cameras: Exif Version 2.2," Standard of Electronics and Information Technology Industries Associate, JEITA CP-3451, Technical Standardization Committee on AV & IT Storage Systems and Equipments, Japan Electronics and Information Technology Industries Association, Apr. 2002 (154 pgs). (retrieved from: http://www.exif.org/Exif2-2.PDF).
Aradhye, Hrishikesh B., "A Generic Method for Determining Up/Down Orientation of Text in Roman and Non-Roman Scripts," Pattern Recognition Society, Dec. 13, 2014, 18 pages.
Bills, Steve, "Automated Amount Scanning is Trend in Remote-Deposit," American Banker, New York, NY, Aug. 30, 2005, (3 pgs).
Braun, Tim, "Camdesk—Towards Portable and Easy Document Capture," Image Understanding and Pattern Recognition Research Group, Department of Computer Science, University of Kaiserslautern, Technical Report, Mar. 29, 2005 (64 pgs). (Retrieved from: https://pdfs.semanticscholar.org/93b2/ea0d12f24c91f3c46fa1c0d58a76bb132bd2.pdf).
Lampert, Christoph et al., "Oblivious Document Capture and Real-Time Retrieval," International Workshop on Camera Based Document Analysis and Recognition (CBDAR), 2005 (8 pgs). (Retrieved from: http://www-cs.ccny.cuny.edu/~wolberg/capstone/bookwarp/LampertCBDAR05.pdf).
Liang, Jian et al., Camera-Based Analysis of Text and Documents: A Survey, International Journal on Document Analysis and Recognition, Jun. 21, 2005, 21 pages.
Luo, Xi-Peng et al., "Design and Implementation of a Card Reader Based on Build-In Camera," Proceedings of the 17th International Conference on Pattern Recognition, 2004, 4 pages.
Vaream, Craig, "Image Deposit Solutions: Emerging Solutions for More Efficient Check Processing," JP Morgan Chase, Nov. 2005 (16 pgs).
Wade, Will, "Early Debate on Remote-Capture Risk," American Banker, New York, NY, May 26, 2004 (3 pgs).
Zandifar, A., "A Video-Based Framework for the Analysis of Presentations/Posters," International Journal on Document Analysis and Recognition, Feb. 2, 2005, 10 pages.
"Quicken Bill Pay", Retrieved from the Internet on Nov. 27, 2007 at: <URL:http://quicken intuit.com/quicken-bill-pay-jhtml>, 2 pgs.
"Start to Simplify with Check Imaging a Smarter Way to Bank", Retrieved from the Internet on Nov. 27, 2007, at: <URL: http://www.midnatbank.com/Internet%20Banking/internet_Banking.html>, 3 pgs.
Motomanual, Motorokr-E6-GSM—English for wireless phone, copyright 2006, 144 pgs.
CBM2019-00005 U.S. Pat. No. 8,699,779, Patent Owner's Sur-Reply Brief to Petitioner's Reply Brief to Patent Owner Preliminary Response Pursuant to Authorization Provided in Paper No. 15, dated May 1, 2019, 7 pgs.
CBM2019-00004 U.S. Pat. No. 8,977,571, Defendant's Claim Construction Brief, *United Services Automobile Association* v. *Wells Fargo Bank, N. A.*, Civil Action No. 2:18-cv-245, dated Apr. 25, 2019, 36 pgs.
CBM2019-00004 U.S. Pat. No. 8,977,571, Patent Owner's Sur-Reply Brief to Petitioner's Reply Brief to Patent Owner Preliminary Response Pursuant to Authorization Provided in Paper 14, dated Apr. 30, 2019, 7 pgs.
USAA'S Reply to Claim Construction Brief, *United Services Automobile Association* v.*Wells Fargo Bank, N. A.*, Civil Action No. 2:18-cv-245, dated May 2, 2019, 15 pgs.
Plaintiff and Counterclaim Defendant's Answer to Defendant and Counterclaims Plaintiff's Amended Answer, Affirmative Defenses, & Counterclaims, *United Services Automobile Association* v. *Wells Fargo Bank, N. A.*, Civil Action No. 2:18-cv-366, dated Apr. 26, 2019, 18 pgs.
USAA's Reply Claim Construction Brief, *United Services Automobile Association* v. *Wells Fargo Bank, N. A.*, Civil Action No. 2:18-cv-245, dated May 2, 2019, 227 pgs.
Parties' P.R. 4-5(D) Joint Claim Construction Chart, *United Services Automobile Association* v. *Wells Fargo Bank, N. A.*, Civil Action No. 2:18-cv-245, dated May 9, 2019, 25 pgs.
CBM2019-00002 U.S. Pat. No. 9,818,090, Decision Denying Institution of Covered Business Method Patent Review 37 C.F.R. § 42.208, dated Apr. 26, 2019, 5 pgs.
CBM2019-00003 U.S. Pat. No. 9,336,517, Decision Denying Institution of Covered Business Method Patent Review 37 C.F.R. § 42.208, dated Jun. 3, 2019, 28 pgs.
CBM2019-00004 U.S. Pat. No. 8,977,571, Decision Denying Institution of Covered Business Method Patent Review 37 C.F.R. § 42.208, dated May 15, 2019, 33 pgs.
CBM2019-00005 U.S. Pat. No. 8,699,779, Decision Denying Institution of Covered Business Method Patent Review 37 C.F.R. § 42.208, dated Jun. 3, 2019, 27 pgs.
USAA's Opening Claim Construction Brief, filed in Civil Action No. 2:18-CV-366, dated May 17, 2019, 670 pgs.
Defendant's Claim Construction Brief, filed in Civil Action No. 2:18-CV-366, dated May 31, 2019, 111 pgs.
Plaintiff's Notice of Filing Claim Construction Presentation, filed in Civil Action No. 2:18-CV-245, dated May 23, 2019, 106 pgs.

(56) References Cited

OTHER PUBLICATIONS

IPR2019-01081 U.S. Pat. No. 9,336,517, Petition for Inter Partes Review of Claims 1, 510, 12-14, 17-20 of U.S. Pat. No. 9,336,517, dated Jun. 5, 2019, 78 pgs.
IPR2019-01082 U.S. Pat. No. 8,977,571, Petition for Inter Partes Review of Claims 1-13 U.S. Pat. No. 9,336,517, dated Jun. 5, 2019, 75 pgs.
IPR2019-01083 U.S. Pat. No. 8,699,779, Petition for Inter Partes Review of Claims 1-18 U.S. Pat. No. 9,336,517, dated Jun. 5, 2019, 74 pgs.
Plaintiff's Notice of Decisions Denying Institution of Covered Business Method Patent Review, filed in Civil Action No. 2:18-CV-245, dated Jun. 6, 2019, 61 pgs.
Claim Construction Memorandum Opinion and Order, filed in Civil Action No. 2:18-CV-245, dated Jun. 13, 2019, 48 pgs.
Parties' P.R.4-5(D) Joint Claim Construction Chart, filed in Civil Action No. 2:18-Cv-245, dated Jun. 14, 2019, 28 pgs.
Defendant's Claim Construction Brief, filed in Civil Action No. 2:18-CV-366, dated May 31, 2019, 28 pgs.
USAA's Reply Claim Construction Brief, filed in Civil Action No. 2:18-CV-366, dated Jun. 7, 2019, 14 pgs.
Wells Fargo's Objections to Magistrate Judge Payne's Claim Construction Memorandum Opinion and Order, filed in Civil Action No. 2:18-CV-245, dated Jun. 27, 2019, 7 pgs.
USAA's Objections to Magistrate Judge Payne's Claim Construction Memorandum Opinion and Order, filed in Civil Action No. 2:18-CV-245, dated Jun. 27, 2019, 6 pgs.
Parties' P.R. 4-5(D) Joint Claim Construction Chart, filed in Civil Action No. 2:18-CV-366, dated Jun. 18, 2019, 27 pgs.
IPR2019-00815, Invalidity Chart, uploaded on Jun. 27, 2019, 94 pgs.
IPR2019-00815, United Services Automobile Association ("USAA")'s Patent Owner Preliminary Response, dated Jun. 27, 2019, 66 pgs.
IPR2019-00815, Supplemental Invalidity Chart, dated on Jun. 27, 2019, 16 pgs.
IPR2019-00815, Declaration of Matthew A. Calman in Support of Patent Owner Preliminary Response, dated Jun. 27, 2019, 25 pgs.
CBM 2019-00027, Declaration of Bharat Prasad, dated Jul. 8, 2019, 32 pgs.
CBM 2019-00027, Patent Owner Preliminary Response and Exhibits 2001-1042, dated Jul. 8, 2019, 91 pgs.
CBM 2019-00028, United Services Automobile Association ("USAA")'s Patent Owner Preliminary Response, dated Jul. 8, 2019, 73 pgs.
CBM2019-00028, Declaration of Matthew A. Calman in Support of Patent Owner Preliminary Response, dated Jul. 8, 28 pgs.
CBM2019-00028, Malykhina, Elena "Get Smart", Copyright 2006 by ProQuest Information and Learning Company, 6 pgs.
CBM2019-00028, Palm Treo 700W Smartphone manual, Copyright 2005 by Palm, Inc., 96 pgs.
CBM2019-00028, 00000 C720w User Manual for Windows Mobile Smart Phone, Copyright 2006, 352 pgs.
CBM2019-00028, "Smarter Than Your Average Phone", Copyright 2006 by Factiva, 4 pgs.
CBM2019-00028, "64 Million Smart Phones Shipped Worldwide in 2006", Canalys Newsroom, 2006, 3 pgs.
CBM2019-00028, Nokia 9500 Communicator user Guide, Copyright 2006 by Nokia Corporation, 112 pgs.
CBM2019-00028, Robinson, Daniel, "Client Week—Handsets advance at 3GSM", Copyright 2004 by VNU Business Publications Ltd., 2 pgs.
CBM2019-00028, Burney, Brett "MacBook Pro with Intel processor is fast, innovative", Copyright 2006 by Plain Dealer Publishing Co., 2 pgs.
CBM2019-00028, 17-inch MacBook Pro User's Guide, Copyright 2006 by Apple Computer, Inc., 144 pgs.
CBM2019-00028, Wong, May "HP unveils new mobile computers", Copyright 2006 by the Buffalo News, 2 pgs.
CBM2019-00028, Jewell, Mark "Cell Phone Shipments Reach Record 208M", Copyright 2005 by Associated Press, 1 pg.
CBM 2019-00028, Lawler, Ryan "Apple shows Intel-based Macs, surge in revenue", Copyright 2006 by the Yomiuri Shimbun, 2 pgs.
CBM 2019-00028, Aspire 9800 Series User Guide, Copyright 2006 by Acer International, 122 pgs.
CBM 2019-00028, Dell XPS M1210 Owner's Manual, Copyright 2006 by Dell Inc., 192 pgs.
CBM 2019-00028, Estridge, Bonnie "Isyour phone smart enough?: The series that cuts through the technobabble to bring you the best advice on the latest gadgets", Coyright 2006 by Xpress—Al Nsr Media, 3 pgs.
CBM 2019-00028, "Motorola, Palm collaborate on smart phone", Copyright 2000 by Crin Communications, Inc., 1 pg.
CBM 2019-00028, Nasaw, Daniel "Viruses Pose threat to 'Smart' Cellphones—Computer Programs Could Cripple Devices and Shut Down Wireless Networks", Copyright 2004 by Factiva, 2 pgs.
CBM 2019-00028, Seitz, Patrick "Multifunction Trend Shaking Up the Handheld Device industry; Solid Sales Expected in 2004; PDA, handset, camera—one single, small product can fill a variety of roles", Copyright 2004 Investor's Business Daily, Inc., 3 pgs.
Microsoft Mobile Devices Buyer's Guide, 2002, 4 pgs.
Microsoft Mobile Devices Smartphone, 2003, 2 pgs.
Plaintiff's Notice of Decision Denying Institution of Covered Business Method Patent Review, filed in Civil Action No. 2:18-CV-245, dated May 15, 2019, 36 pgs.
Defendant's Claim Construction Brief, filed in Civil Action No. 2:18-CV-366, dated Jun. 24, 2019, 28 pgs.
CBM2019-00029, United Services Automobile Association (USAA)'s Patent Owner Preliminary Response, dated Jul. 17, 2019, 76 pgs.
CBM2019-00029, Declaration of Matthew A. Calman in Support of Patent Owner Preliminary Response, dated Jul. 17, 2019, 29 pgs.
CBM2019-00029, Defendant's Claim Construction Brief, filed in Civil Action No. 2:18-CV-366, dated May 31, 2019, 28 pgs.
CBM2019-00029, Palenchar, Joseph, "PDA Phone Adds WiFi VoIP, Turn-By-Turn GPS Navigation", Copyright 2006 by Reed Business Information, 2 pgs.
CBM2019-00029, HP User Guide, Additional Product Information, Copyright 2006 by Hewlett-Packard Development Company, L.P., 204 pgs.
CBM2019-00029, Pocket PC User Manual, Version 1, dated May 2006 by Microsoft, 225 pgs.
CBM2019-00029, "Dynamism.com: Take tomorrow's tech home today with Dynamism.com: Latest gadgets merge next generation technology with high style design", Copyright 2006 Normans Media Limited, 2 pgs.
IPR2019-00815, Federal Reserve Financial Services Retired: DSTU X9.37/2003, Specifications for Electronic Exchange of Check and Image Data, Copyright 2006 by Accredited Standards Committee X9, Inc., dated Mar. 31, 2003, 157 pgs.
IPR2019-01081, Declaration of Peter Alexander, Ph.D, dated Jun. 5, 2019, 135 pgs.

SYSTEMS AND METHODS FOR OBTAINING AN IMAGE OF A CHECK TO BE DEPOSITED

CROSS-REFERENCE TO RELATED APPLICATIONS

This application is a continuation application of U.S. application Ser. No. 11/877,335, which is incorporated by reference herein in its entirety. This application is related by subject matter to the following commonly assigned applications, the entirety of which are hereby incorporated by reference herein: U.S. patent application Ser. No. 11/877,307, U.S. patent application Ser. No. 11/877,367, U.S. patent application Ser. No. 11/877,382, U.S. patent application Ser. No. 11/877,404, each filed on Oct. 23, 2007, and each entitled "Systems and Methods for Obtaining An Image Of A Check To Be Deposited".

BACKGROUND

A check is a negotiable instrument. Formally, a check is an order that a "drawer" (the party who writes the check, and from whose bank account the money is to be drawn) issues to a "drawee bank" (the bank at which the drawer's money is located), and the order instructs the drawee bank to pay a "payee" (the party to whom the check is written). A check is negotiated by the payee's presenting the check to the drawee bank. The presentment process is normally initiated by the payee's bank, which presents the check to the drawee bank when the payee deposits the check with his or her bank.

Presentment of a check is normally done through the Federal Reserve or a commercial banking system. Traditionally, the mechanism by which this presentment occurs is by tendering the paper check through the banking system. The paper check is physically transmitted to the drawee bank, which either accepts and pays the paper check upon receipt, or declines payment and returns the paper check. Technological and legal developments, such as procedures set forth in the Check-21 law, allow images of checks (sometimes referred to as "substitute checks") to be presented electronically without presentment of a paper copy. Thus, starting the presentment process may involve collecting an image of the check rather than obtaining the original paper check. Check scanners have traditionally been available to read the Magnetic Ink Character Recognition (MICR) line at the bottom of the check, and this information can be used for presentment. However, it is possible to present an ordinary image of a check, where the image is collected with ordinary image scanning equipment.

A customer can take the paper check to a bank for deposit and have the bank scan the check to obtain an image. However, it is also possible to collect the image of the check from the customer who is depositing the check.

SUMMARY

An image of a check to be presented for payment can be collected from a banking customer using the customer's scanning equipment. The customer can scan the check into one or more files (e.g., one file for the front, a second file for the back). The files can then be uploaded to a server operated by the customer's bank, and the images contained in the files can be presented through the banking system for payment by the drawee bank.

The customer's bank may operate software, such as software provided on a web site, that guides the customer through the process of obtaining the check images. For example, the customer may visit the bank's web site, and the web site may instruct the customer to obtain images of both sides of the check, may instruct the customer how to position the check in the scanner, may instruct the customer as to what image format and/or resolution to use, etc. The web site may also guide the user through the process of delimiting the boundary of the check, such as by identifying a corner of the check. The bank's software can also perform certain verifications on the check, such as verifying the check against legibility and/or size standards, verifying that there is an endorsement on the back of the check, verifying that the amount of money written on the check matches the amount that the customer has indicated in a deposit request, etc.

This summary is provided to introduce a selection of concepts in a simplified form that are further described in the detailed description. This summary is not intended to identify key features or essential features of the claimed subject matter, nor is it intended to be used to limit the scope of the claimed subject matter.

DETAILED DESCRIPTION

Figure 1:
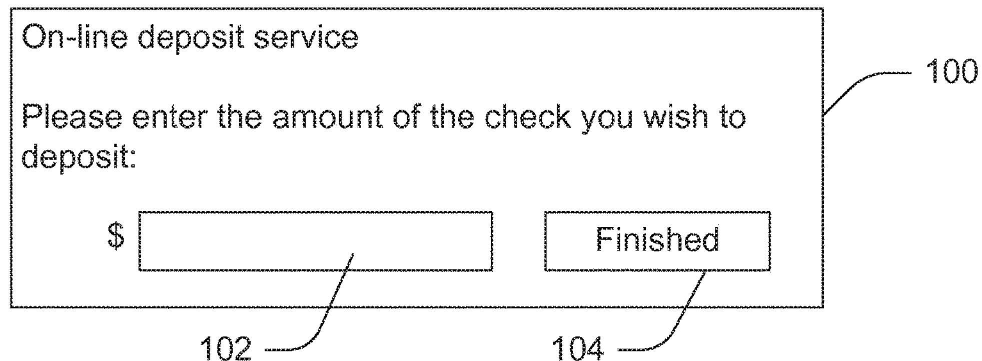
FIG. 1 is a diagram of a user interface that requests that a depositor enter an amount of a deposit.

A web site can guide a user through the process of collecting images of a check to be deposited. In some cases, the web site can provide software, such as a browser-executable applet, that drives the process of collecting images by operating the customer's scanner. For example, after the customer enters an amount of a check to be deposited, the software provided on the web site can instruct the user to place the check in the scanner bed and to click a button when ready. The software can then cause the scanner to be started, can collect the image in an appropriate format and resolution, and can then upload the image for deposit. The software can repeat the process for both sides of the check, in order to obtain images of the front and the back.

Having the web site drive the image-collection process may be simple for the customer (e.g., the bank depositor who uses the web site), since the customer may not have to address issues such as what to name the file, what format or resolution to use. Having the web site drive the process also may avoid, for the customer, the process of identifying particular files to be uploaded. However, certain permissions may be used in order to allow the web site's software to operate the scanner. Scanners are normally operated by a device driver, such as a TWAIN driver. For security reasons, the driver may require certain certificates to be used before allowing a program to operate the scanner that the driver controls. Since users often transparently download programs to run in their web browsers without realizing that they are downloading programs, programs such as applets, scripts, etc., that run in web browsers often present a particular security risk, and a driver may require such a program to obtain a certificate before it allows the program to control the scanner. Each scanner (or the scanners within a brand-mate family), may have its own driver. The drivers may be different for different operating environments—e.g., the same scanner may use a different driver depending on whether it is being operated from an environment based on one of the WINDOWS operating systems, an environment based on one of the operating systems used in APPLE computers, an environment based on a version of the LINUX operating system, etc. Each driver may use different certificates. Moreover, the different environments may use various different environment-specific technologies to allow the scanner to be controlled from a remote web server. Since the bank that operates the web site does not know what scanning equipment or operating environment its customer will be using, it may need to obtain a large number of certificates, and may need to interface with a large number of different technologies, to support a large number of scanner-environment combinations, in order to allow its software to control scanners for a variety of customers.

At present, most consumers use computers whose environment is based on one of the WINDOWS operating systems. Thus, it may make sense from a cost-benefit perspective, for a bank to obtain the certificates to operate a wide variety of scanners in environments based on the WINDOWS operating systems, and to support the technology that allows the scanner to be controlled within that environment. However, it may not make sense from a cost-benefit perspective for the bank to obtain the certificates to operate lesser-used scanners, or scanners in environments other than those based on the WINDOWS operating systems. Thus, an alternative mechanism for obtaining an image of the check may be used. One example of such a mechanism is to have the customer scan an image of the check (or separate images of the front and back of the check) into a file, and then upload the file(s) to the bank's server for presentment through a banking system.

Figure 2:
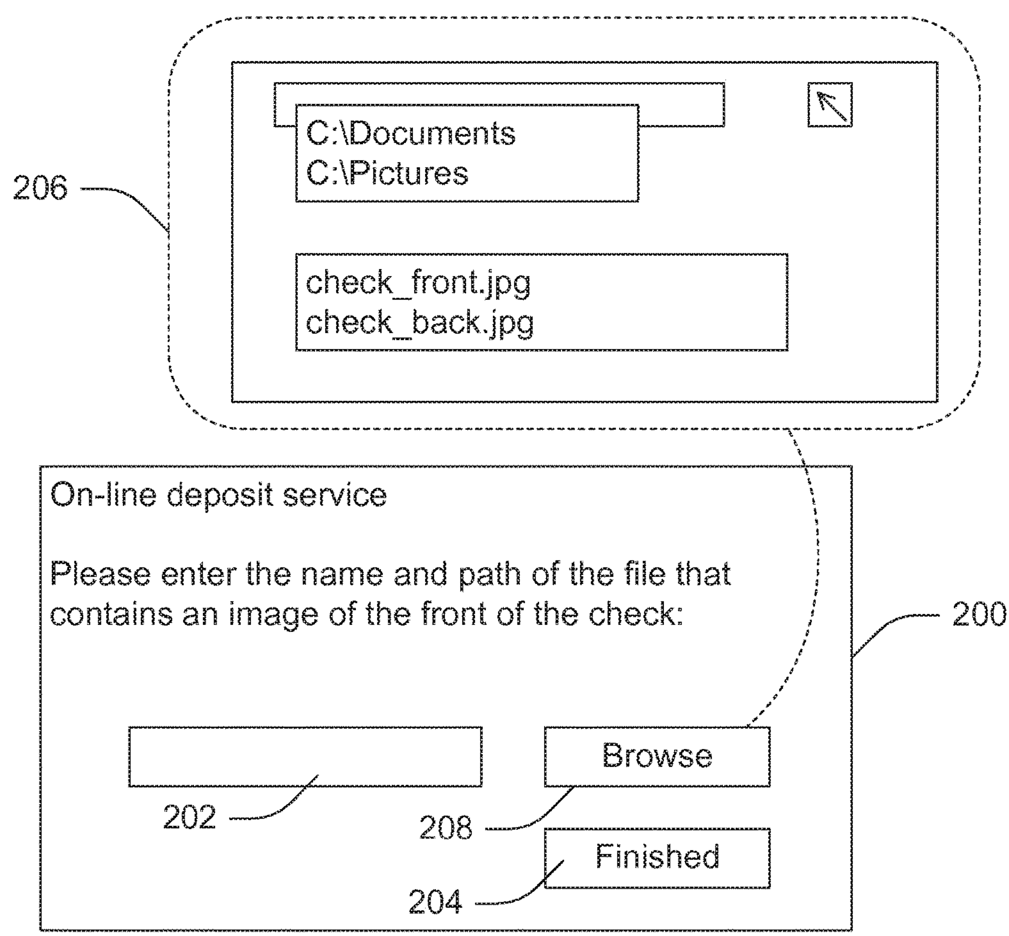
FIG. 2 is a diagram of a user interface that requests that a depositor provide an image of a first side of a check.
Figure 3:
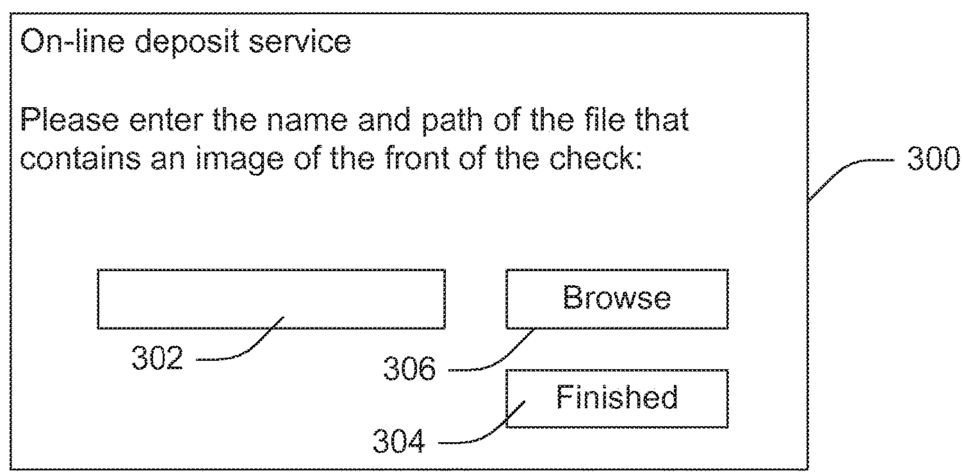
FIG. 3 is a diagram of a user interface that requests that a depositor provide an image of a second side of a check.

Turning to the drawings, FIGS. 1, 2, and 3 show examples of user interfaces that could be presented to a user in order to obtain a deposit amount and the appropriate check images. These user interfaces could be presented through a web site—e.g., by delivering to a depositor's computer or other machine, web pages that cause these user interfaces to be displayed on the depositor's browser. However, these user interfaces could be presented using any mechanism.

In FIGS. 1-3, the depositor is asked to enter an amount of a check to be deposited, and is then asked to provide scanned images of the front and back of the check. Thus, in FIG. 1, user interface 100, the depositor is requested to enter the amount of a check to be deposited into box 102. This amount can be entered in the form of text. When the depositor has entered the amount of the check to be deposited, the depositor may click button 104, indicating that he or she is "finished." FIG. 1 shows an example in which the depositor is requested to enter an amount of a single check to be deposited. However, the depositor could also be given a set of boxes to enter an arbitrary number of checks, or could be asked to enter an aggregate amount of a deposit covering several checks, or could be asked for an amount of a deposit in any other way.

FIG. 2 shows user interface 200, which requests that the depositor enter a name of a file containing an image of the front of the check to be deposited. The name, and optionally the path, of the file can be entered into box 202. When the depositor has entered the name of the file, he or she can click button 204 to indicate that he or she is "finished" entering the name. The name can be entered either by the depositor typing the name as text into box 202. Or, as another example, the depositor can be presented with a file navigation user interface 206. The depositor may click button 208 ("browse") to access file navigation user interface 206. File navigation user interface 206 may show the depositor's local and/or network folder structure, and allow the depositor to navigate through folders and files to obtain the name of the file containing the image. When the depositor has selected the name of the file, the name (or name and path) of the file may appear in box 202 as if the depositor had typed the name (or name and path). User interface 200 could also include information and/or instructions for the depositor about the rules that govern the nature of the image to be provided—e.g., text could be displayed or communicated in user interface 200 that advises the depositor as to the format of the image to be provided (e.g., JPEG), the resolution of the image (e.g., 200 dpi), other parameters (e.g., turning on grayscale for the scan), etc. As another example, the depositor could be shown examples of "good" and "bad" scans—e.g., an image could be shown to the depositor indicating an example of scan that would be accepted, and another image could be shown to the depositor indicating an example of a scan that would not be accepted. A scan that would not be accepted might be shown as being smudged, or crooked, or obscured in some manner. There are a variety of reasons for which a scan might not be accepted, and examples demonstrating any one or more of these reasons could be shown to the depositor.

FIG. 3 shows user interface 300, which is similar to user interface 200 but asks the depositor to enter the name of a file containing an image of the back of the check instead of the front. Like user interface 200, user interface 300 may have a box 302 into which the depositor can enter the name of the file containing the appropriate image, a button 304 that the depositor can click when he or she is finished entering the file name, a browse button 306 that the depositor can use to access a file navigation user interface similar to that shown in FIG. 2 and previously discussed. Additionally user interface 300 may inform and/or instruct the depositor as to issues concerning format, resolution, other parameters, etc.

Figure 4:
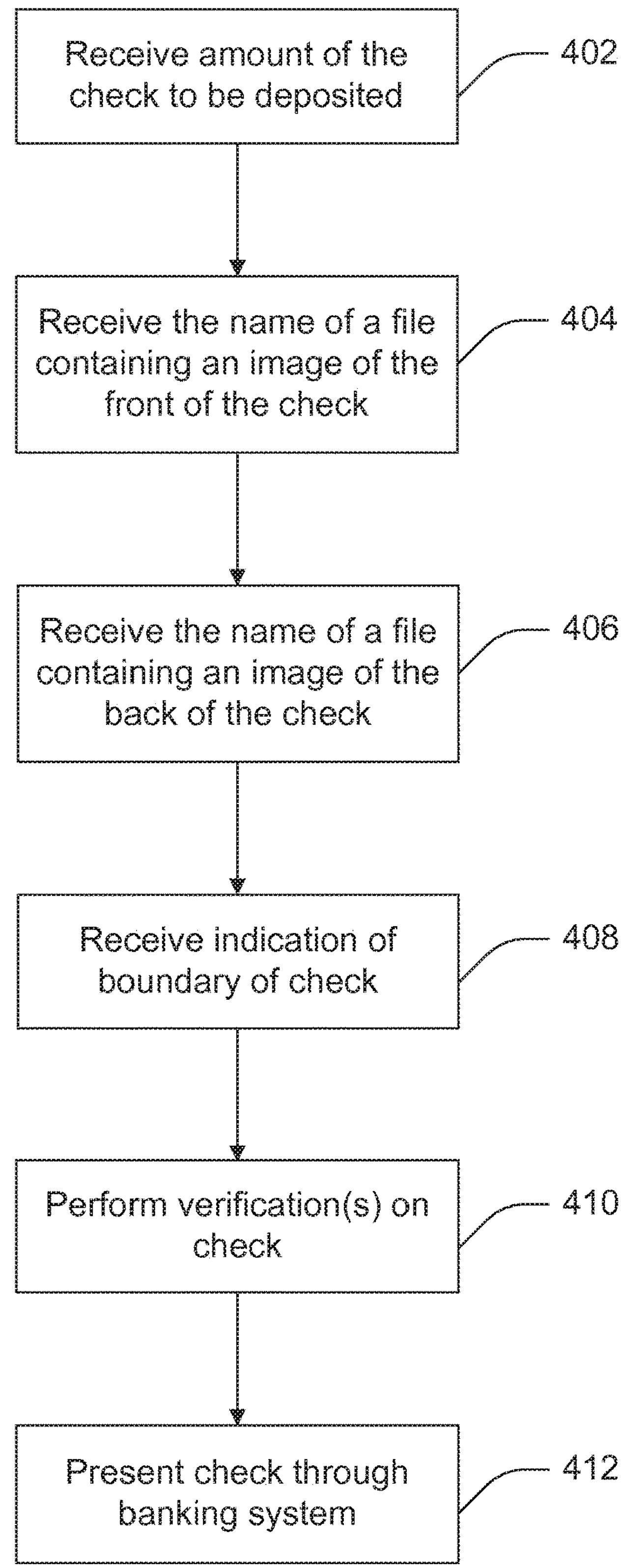
FIG. 4 is a flow diagram of an example process whereby an image of a check is received and presented for payment.
Figure 5:
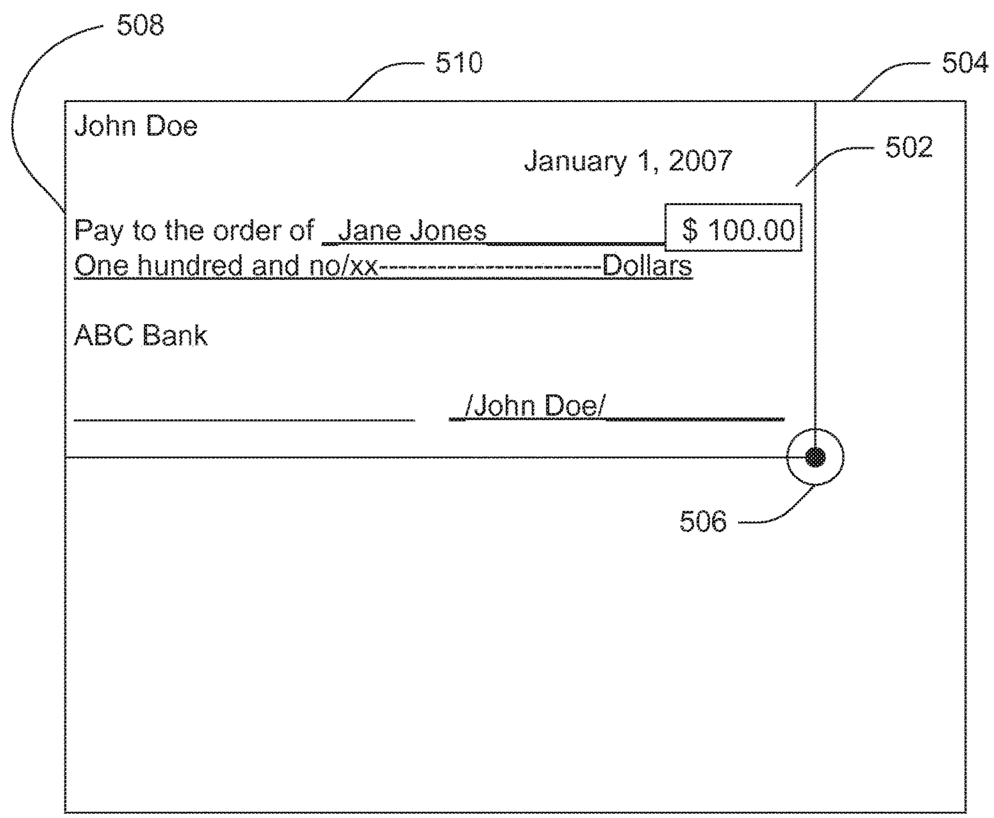
FIG. 5 is a diagram of an example user interface in which a user marks a boundary of a check.

FIG. 4 is a flow diagram of an example process whereby an image of a check is received and presented for payment. It is noted that the process of FIG. 4, as well as the process discussed subsequently in connection with FIG. 5, are both described, by way of example, with reference to a web server that interacts with a depositor by communicating through a network with a browser running on the depositor's machine. However, these processes may be carried out in any system, and are not limited to the scenarios described. Moreover, these flow diagrams show examples in which stages of a process are carried out in a particular order, as indicated by the lines connecting the blocks, but the various stages shown in these diagrams can be performed in any order, or in any combination or sub-combination.

At 402, an amount of a check to be deposited is received. For example, a user interface (such as user interface 100, shown in FIG. 1) may be used to ask a depositor for the amount of a check to be deposited. As previously noted, the depositor may be given the opportunity to enter an amount of a single check, a list of amounts for plural checks, an aggregate total amount of plural checks, etc. At least one such amount is received at 402.

At 404, a name of a file that contains an image of the front side of the check is received. For example, a user interface (such as user interface 200, shown in FIG. 2) may be used to obtain the name (or name and path) of a file that contains an image of the check. The user may have already scanned the check and placed the image in a file, or the user can be instructed to scan the check (or a side of the check) at the time that the file name is to be received. The file whose name is entered may be uploaded to a server, such as a web server operated by the bank with which the check is to be deposited.

At 406, a name of a file that contains an image of the back side of the check is received. For example, a user interface (such as user interface 300, shown in FIG. 3) may be used to obtain the name (or name and path) of a file that contains an image of the check. As with 404, the user may already have scanned the check into an image file, or can be instructed to do so. The file whose name is entered may be uploaded to a server, such as a web server operated by the bank with which the check is to be deposited.

At 408, the boundaries the check are received. For example, the user may be asked to draw a boundary on the image to indicate which part of the image is the check, and which part is merely background due to the fact that amount of area scanned is generally larger than a check. One way to obtain an indication of the location of this boundary is to ask the user to scan the check by placing the top and left edges of the check directly abutting the top and left sides of the scanner bed. Thus, the top and left edges of the boundary of the check are defined by the edges of the scanning sight. Presuming that the check is a rectangle, the bottom and right edges that define the remaining portion of the boundary can be indicated by a single point in the bottom, right corner of the check. An example of this technique is shown in FIG. 5.

FIG. 5 shows a check 502, which has been scanned. Sight 504 indicates the area that has been scanned, and it can be seen that left edge 508 and top edge 510 of check 502 abut the left and top edges of the scan sight. By placing a marker (such as dot 506) in the right, bottom corner of the check, the rectangular boundary of the check is defined. Thus, it can be determined from the position of the marker which portion of sight 504 contains an image of a side of check 502, and which portion contains background. The portion that contains the image can later be used to present the check for payment through a banking system. It is noted that the marker can be positioned through various mechanisms. For example, a web server that implements the process of collecting a deposit request and check images from a depositor can download software (e.g., a plug-in, an applet, a script, etc.) that executes in the depositor's browser and allows the depositor to position a marker such as dot 506 with a pointing device, such as a mouse, trackpad, etc. This program could be used to place the marker on the image before the image is uploaded to the bank's server. As another example, the bank's server could receive the image, and then send a copy or modified version of the image back to the depositor's web browser to be operated on the program. For example, after the upload of the image, the bank's web server could cause a new window to be opened with a page containing the image, and a script, applet, plug-in, etc., that allows the depositor to place the marker. Any mechanism to allow the depositor to place the marker could be used.

Returning to FIG. 4, certain types of verifications may be performed (at 410) on the check images that have been received. For example, the images could be verified to determine they are in an acceptable format, at an acceptable resolution, or that the amount of the check shown on the front of the check matches the amount stated by the depositor, or that the back of the check contains an endorsement, or that the check complies with size standards (or other standards) according to applicable law such as the Check-21 law. In one example, the system may check that the images are in the JPEG format, or that the images are at least 200 dpi in resolution, or that the capture of the image preserves grayscale. Resolution and/or grayscale can be addressed as part of the process of verifying that the image is in an acceptable format, or compliance with resolution and grayscale parameters could be checked separately. A comparison of the amount of the check as stated by the depositor with the amount written on the check can be performed by using optical character recognition (OCR) on the check to determine the amount that it states. Or, as another example, the check could be examined by a human and compared with the amount entered by the depositor. Similarly, the presence of an endorsement on the image of the back of the check could be detected using OCR (or some other type of image processing), or could be evaluated by a human.

Figure 7:
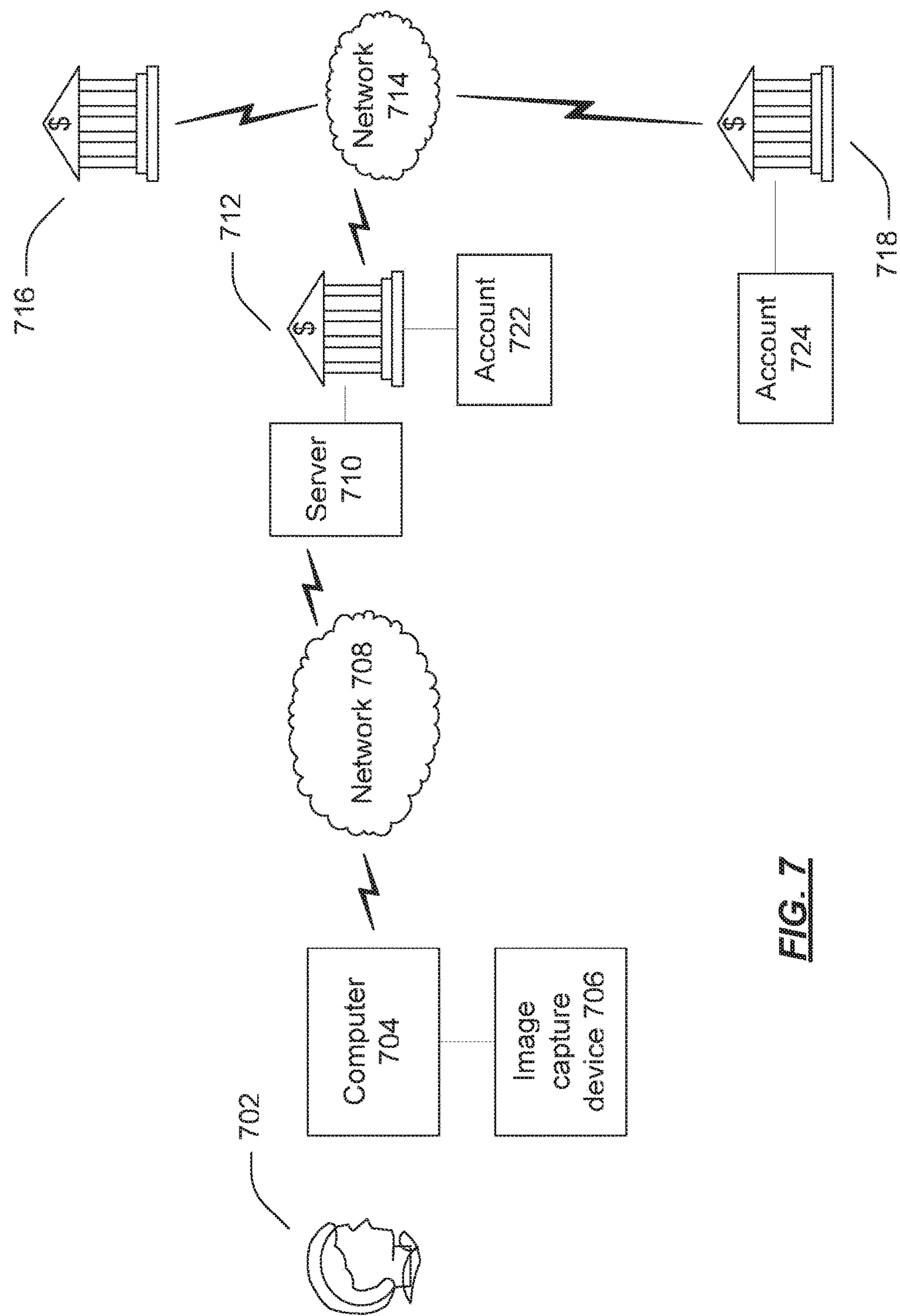
FIG. 7 is a block diagram of an example environment in which checks may be deposited and presented.

At 412, the images of the front and back of the check are presented for payment through a banking system. For example, a banking system such as the Federal Reserve or a commercial banking system may operate a server to which these images can be provided, and the images can be presented to the drawee bank through such system. An example of a banking system is shown in FIG. 7, and is discussed subsequently.

Figure 6:
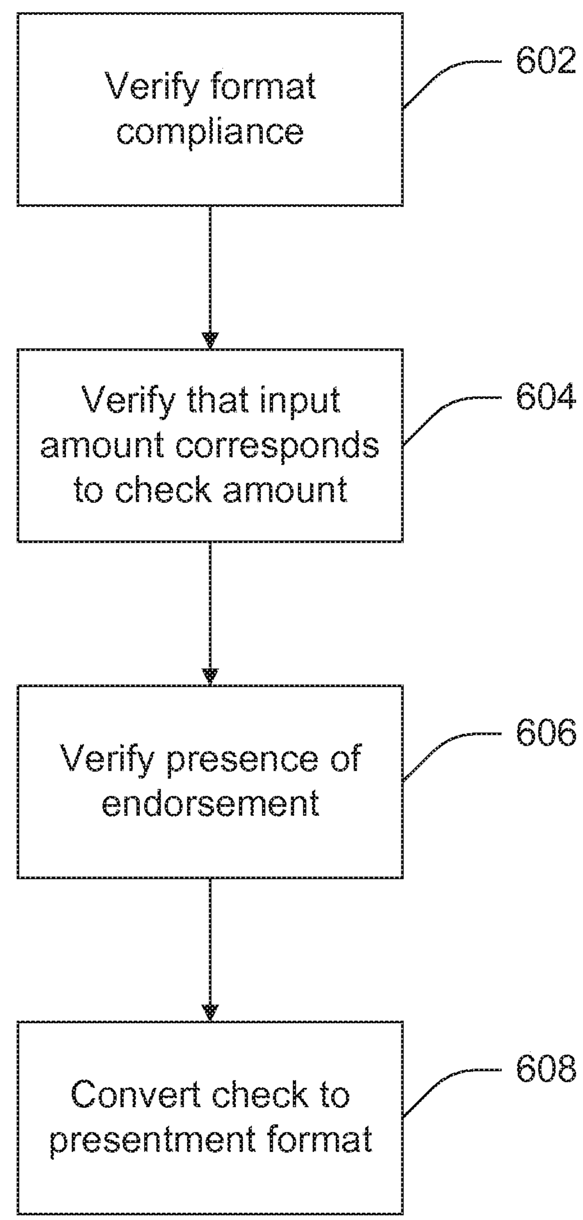
FIG. 6 is a flow diagram of various stages that can be performed after an image of a check is received by a bank from a depositor.

FIG. 6 shows an example of various stages that can be performed after an image of a check is received by a bank from a depositor. For example, when images of a check are from a depositor by the bank's web server, certain processing can be performed on the image to prepare the check for presentment through a banking system. FIG. 6 shows examples of stages of such processing. It should be noted that 602, 604, and 606, as shown in FIG. 6, provide additional detail of features that are discussed previously in connection with 410 in FIG. 4.

At 602, the files containing the image may be evaluated to determine whether they are in an appropriate format. For example, features of the images, such as file format (e.g., JPEG, GIF, TIF, etc.) may be evaluated. In one example, the depositor may be instructed to upload the images in JPEG format, and an image may be rejected if the evaluation at 602 determines that the image is in a different format. Additional features that may be evaluated include resolution of the image, the presence of grayscale, compliance with legal standards such as Check-21, etc.

At 604, a verification may be performed to determine that the amount of money written on the check corresponds to the amount of the check reported by the depositor. For example, the image of the front of the check can be evaluated by an OCR process, read by a human, etc., and this amount can be compared to the amount of the deposit as entered by the depositor.

At 606, the image of the back of the check may be evaluated to determine the presence of an endorsement. For example, an OCR process, or other type of image processing, may be performed to determine whether the image contains an endorsement. Or the image can be given to a human to evaluate for the presence of an endorsement.

At 608, the images of the check may be converted to an appropriate format for presentment through a banking system. For example, the banking system may impose certain standards such as file format, headers, metadata, etc. The images may be modified and/or packaged to comply with these standards prior to presentment of the check images through a banking system.

FIG. 7 shows an example environment in which checks may be deposited and presented. Depositor 702 may be a customer of financial institution 712. Financial institution 712 may, for example, be a bank, but could also be any other type of financial institution, such as an investment company, an insurance company, etc. Depositor may operate a computer 704, which may be located at depositor 702's residence, but could also be located in any other place. Computer 704 may be connected to image capture device 706, which may be a scanner, camera, etc. Computer 704 may be connected to other machines through network 708. The Internet is an example of network 708, although computer 704 could be connected to other machines through any network.

One example of a machine that computer 704 could be connected to through network 708 is server 710, which, in this example, is a server operated by depositor 702's financial institution 712. Server 710 may operate software that implements a web site, and depositor 702 may use that web site to interact with financial institution 712, for example by tendering checks for deposit into an account with financial institution 712 through the web site. As previously discussed, one way that a depositor could tender a check for deposit is to provide scanned images of the check and to upload the images to a web site associated with a bank. If depositor 702 uses image capture device 706 to scan images of a check, and then uses a browser running on computer 704 to upload such images to server 710 through network 708, then this scenario would be one example of the subject matter described herein. However, the subject matter described herein encompasses other scenarios.

Financial institutions 716 and 718 are financial institutions such as banks, investment companies, insurance companies, etc. They may also include a clearinghouse or a national central bank (such as the Federal Reserve or a branch thereof). Financial institutions 712, 716, and 718 may communicate with each other via a network 714. Network 714 may be a publicly-accessible network, such as the Internet, but also may be a private network. For example, financial institutions 712, 716, and 718 may have security issues when they communicate with each other that do not apply to ordinary communications, and thus network 714 may provide security features that network 708 does not. However, network 714 could be any type of network.

Account 722, in the example of FIG. 7 is an account that depositor 702 maintains at financial institution 712. Depositor 702 may be in possession of a check that is drawn against account 724 maintained at financial institution 718 (in which case financial institution 718 is the drawee). Depositor 702 may deposit the check into account 722 by delivering the check to financial institution 712, where such delivery may be in the form of physical delivery of the original paper check, sending an image of the check, etc. Upon receipt of the check (whether in paper form, image form, or otherwise), financial institution 712 may clear the check by presenting the check through a banking system, such as banking system 720. Presentment of the check may be made directly to drawee financial institution 718, or could be made to an intermediary financial institution, such as a branch of the Federal Reserve, a correspondent bank, a clearinghouse, etc. The intermediary bank can be a government actor (as in the case of the Federal Reserve in the United States, or the central bank of another country), or it could be a commercial actor, such as a correspondent bank or clearinghouse.

In one example, the check is cleared by presenting the check to financial institution 716, which may, for example, be a regional branch of the Federal Reserve, along with a request for payment. Financial institutions 712 and 718 may each have accounts at financial institution 716. Financial institution 712 may create a substitute check using an image provided by depositor 702, and may present the substitute check to financial institution 716. Upon receiving the substitute check, financial institution 716 may identify financial institution 718 as the drawee bank—e.g., by using the nine-digit routing number that is normally printed on checks in the United States. Financial institution 716 may then present the substitute check to financial institution 718 and request that the check be paid. If financial institution 718 agrees to honor the check, then financial institution 716 may then settle the check by debiting funds from an account of financial institution 718 and crediting funds to an account of financial institution 712.

It will be appreciated that the preceding examples are for illustration, and not limitation. For example, financial institution 718 may have a relationship with financial institution 712, and financial institution 712 may use this relationship to clear the check directly with financial institution 718, while bypassing the Federal Reserve, other national central bank, or clearinghouse. In addition, accounts 722 and 724 could be held at the same financial institution 712, in which case the check may be cleared internally.

Figure 8:
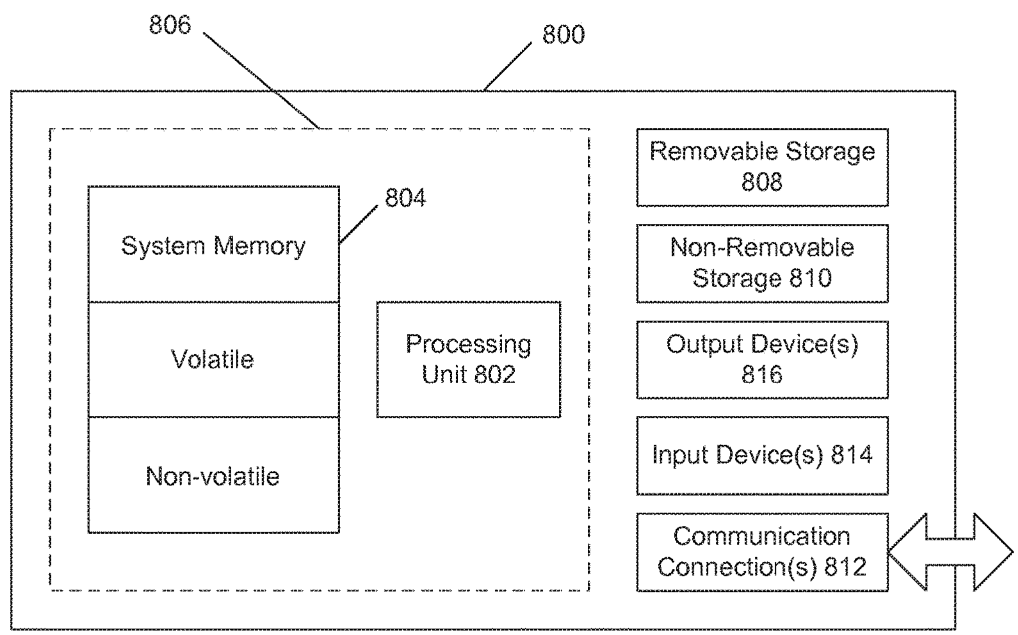
FIG. 8 is a block diagram of an example computing environment in which example embodiments and aspects may be implemented.

The subject matter described herein may be implemented through the use of a computer system, or other type of device that has some computing mechanism(s). FIG. 8 shows an example computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the previously-described systems or devices, and the like.

Computer-executable instructions, such as program modules, being executed by a computer may be used. Generally, program modules include routines, programs, objects, components, data structures, etc., that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 8, an example system for implementing aspects described herein includes a computing device, such as computing device 800. In its most basic configuration, computing device 800 typically includes at least one processing unit 802 and memory 804. Depending on the exact configuration and type of computing device, memory 804 may be volatile (such as random access memory (RAM)), non-volatile (such as read-only memory (ROM), flash memory, etc.), or some combination of the two. This most basic configuration is illustrated in FIG. 8 by dashed line 806.

Computing device 800 may have additional features/functionality. For example, computing device 800 may include additional storage (removable and/or non-removable) including, but not limited to, magnetic or optical disks or tape. Such additional storage is illustrated in FIG. 8 by removable storage 808 and non-removable storage 810.

Computing device 800 typically includes a variety of computer readable media. Computer readable media can be any available media that can be accessed by computing device 800 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 804, removable storage 808, and non-removable storage 810 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 800. Any such computer storage media may be part of computing device 800.

Computing device 800 may also contain communications connection(s) 812 that allow the device to communicate with other devices. Communications connection(s) 812 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Computing device 800 may also have input device(s) 814 such as keyboard, mouse, pen, voice input device, touch input device, etc. Output device(s) 816 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described previously. Rather, the specific features and acts described previously are disclosed as example forms of implementing the claims.

The invention claimed is:

1. A negotiable instrument processing system comprising:

a memory; and a processor in communication with the memory and configured to:

communicate, via a network, with a depositor-controlled computing device;

send, via the network, instructions to the depositor-controlled computing device, the instructions configured for execution on the depositor-controlled computing device, the instructions further configured, upon execution to:

request data listed on a negotiable instrument;

receive depositor input indicative of the data listed on the negotiable instrument;

set at least one parameter on a hardware image capture device of the depositor-controlled computing device in order to generate an image of the negotiable instrument;

receive depositor input indicative of authorizing activation of the image capture device;

in response to receiving the depositor input indicative of authorizing activation of the image capture device, command the image capture device to obtain an image of the negotiable instrument using the image capture device set at the at least one parameter; and send the image of the negotiable instrument and the depositor input indicative of the data listed on the negotiable instrument for analysis of the image of the negotiable instrument in order to verify that the input indicative of the data listed on the negotiable instrument matches the data listed on the negotiable instrument in the image, wherein the instructions, upon execution by the depositor-controlled computing device, causes the setting of the at least one parameter on the image capture device to enable, upon activation of the image capture device, the image capture device to capture the image with the setting of the at least one parameter.

2. The negotiable instrument processing system of claim 1, the instructions further configured, upon execution to: request activation of the image capture device; and responsive to receiving the activation of the image capture device, command the image capture device to obtain the image of the negotiable instrument using the image capture device set at the at least one parameter.

3. The negotiable instrument processing system of claim 2, wherein the instructions are configured to set resolution on the image capture device in order to capture the image at the resolution.

4. The negotiable instrument processing system of claim 3, wherein the instructions are configured to set a file format on the image capture device in order to capture the image in the file format.

5. The negotiable instrument processing system of claim 4, wherein the image is included in a file;

wherein the instructions are further configured to name the file for the image; and wherein the instructions are further configured to automatically send the file to the negotiable instrument processing system.

6. The negotiable instrument processing system of claim 1, wherein, in response to receiving the depositor input indicative of authorizing activation of the image capture device, the instructions are configured to command the image capture device to obtain the image of the negotiable instrument at a set format and resolution, and automatically upload the image of the negotiable instrument.

7. The negotiable instrument processing system of claim 1, wherein the negotiable instrument comprises a check; and wherein the image capture device comprises a camera.

8. A method for processing a negotiable instrument comprising:

receiving, via a network at a depositor-controlled computing device, instructions configured for execution on the depositor-controlled computing device; and executing the instructions to:

request data listed on a negotiable instrument;

receive depositor input indicative of the data listed on the negotiable instrument;

set at least one parameter on a hardware image capture device of the depositor-controlled computing device in order to generate an image of the negotiable instrument;

receive depositor input indicative of authorizing activation of the image capture device;

in response to receiving the depositor input indicative of authorizing activation of the image capture device, command the image capture device to obtain an image of the negotiable instrument using the image capture device set at the at least one parameter; and send the image of the negotiable instrument and the depositor input indicative of the data listed on the negotiable instrument for analysis of the image of the negotiable instrument in order to verify that the input indicative of the data listed on the negotiable instrument matches the data listed on the negotiable instrument in the image, wherein the instructions, upon execution by the depositor-controlled computing device, causes the setting of the at least one parameter on the image capture device to enable, upon activation of the image capture device, the image capture device to capture the image with the setting of the at least one parameter.

9. The method of claim 8, further comprising requesting activation of the image capture device; and wherein, responsive to receiving the activation of the image capture device, commanding the image capture device to obtain the image of the negotiable instrument using the image capture device set at the at least one parameter.

10. The method of claim 9, wherein setting at least one parameter on the image capture device comprises setting resolution on the image capture device in order to capture the image at the resolution.

11. The method of claim 10, wherein setting at least one parameter on the image capture device comprises setting a file format on the image capture device in order to capture the image in the file format.

12. The method of claim 11, wherein the image is included in a file;

wherein the instructions are further configured to name the file for the image; and wherein the instructions are further configured to automatically send the file to a negotiable instrument processing system.

13. The method of claim 8, wherein, in response to receiving the depositor input indicative of authorizing activation of the image capture device, the image capture device is commanded to obtain the image of the negotiable instrument at a set format and resolution, and automatically upload the image of the negotiable instrument.

14. The method of claim 8, wherein the negotiable instrument comprises a check; and wherein the image capture device comprises a camera.

15. A non-transitory computer-readable storage medium comprising computer-readable instructions configured for execution using a network browser running on a depositor-controlled computing device, the instructions configured, upon execution to:

request data listed on a negotiable instrument;

receive depositor input indicative of the data listed on the negotiable instrument;

set at least one parameter on a hardware image capture device of the depositor-controlled computing device in order to generate an image of the negotiable instrument;

receive depositor input indicative of authorizing activation of the image capture device;

in response to receiving the depositor input indicative of authorizing activation of the image capture device, command the image capture device to obtain an image of the negotiable instrument using the image capture device set at the at least one parameter; and send the image of the negotiable instrument and the depositor input indicative of the data listed on the negotiable instrument for analysis of the image of the negotiable instrument in order to verify that the input indicative of the data listed on the negotiable instrument matches the data listed on the negotiable instrument in the image, wherein the instructions, upon execution by the depositor-controlled computing device, causes the setting of the at least one parameter on the image capture device to enable, upon activation of the image capture device, the image capture device to capture the image with the setting of the at least one parameter.

16. The non-transitory computer-readable storage medium of claim 15, the instructions further configured, upon execution to: request activation of the image capture device; and responsive to receiving the activation of the image capture device, command the image capture device to obtain the image of the negotiable instrument using the image capture device set at the at least one parameter.

17. The non-transitory computer-readable storage medium of claim 16, wherein the instructions are configured to set resolution on the image capture device in order to capture the image at the resolution.

18. The non-transitory computer-readable storage medium of claim 17, wherein the instructions are configured to set a file format on the image capture device in order to capture the image in the file format.

19. The non-transitory computer-readable storage medium of claim 18, wherein the image is included in a file;

wherein the instructions are further configured to name the file for the image; and wherein the instructions are further configured to automatically send the file to a negotiable instrument processing system.

20. The non-transitory computer-readable storage medium of claim 15, wherein, in response to receiving the depositor input indicative of authorizing activation of the image capture device, the instructions are configured to command the image capture device to obtain the image of the negotiable instrument at a set format and resolution, and automatically upload the image of the negotiable instrument.

21. The non-transitory computer-readable storage medium of claim 15, wherein the negotiable instrument comprises a check; and wherein the image capture device comprises a camera.

* * * * *